United States Patent
Manolakos et al.

(10) Patent No.: US 12,200,727 B2
(45) Date of Patent: Jan. 14, 2025

(54) SHARED CHANNEL REFERENCE SIGNAL BUNDLING AND MULTIPLE CONCURRENT SHARED CHANNEL TRANSMISSIONS

(71) Applicant: QUALCOMM INCORPORATED, San Diego, CA (US)

(72) Inventors: Alexandros Manolakos, Escondido, CA (US); Seyedkianoush Hosseini, San Diego, CA (US); Gokul Sridharan, Sunnyvale, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 17/758,799

(22) PCT Filed: Mar. 4, 2021

(86) PCT No.: PCT/US2021/020892
§ 371 (c)(1),
(2) Date: Jul. 13, 2022

(87) PCT Pub. No.: WO2021/178676
PCT Pub. Date: Sep. 10, 2021

(65) Prior Publication Data
US 2023/0043462 A1    Feb. 9, 2023

(30) Foreign Application Priority Data

Mar. 5, 2020  (GR) .............................. 20200100122

(51) Int. Cl.
*H04W 72/23*    (2023.01)
(52) U.S. Cl.
CPC .................... *H04W 72/23* (2023.01)
(58) Field of Classification Search
None
See application file for complete search history.

(56) References Cited

U.S. PATENT DOCUMENTS 10,560,297 B1   2/2020  Baldemair et al.
11,637,672 B2 *  4/2023  Saito ................. H04W 72/0453
                                                        370/329
(Continued)

FOREIGN PATENT DOCUMENTS

CN        110140323 A      8/2019
WO    WO-2019231368 A1    12/2019

OTHER PUBLICATIONS

International Search Report and Written Opinion—PCT/US2021/020892—ISA/EPO—Jul. 21, 2021.

(Continued)

*Primary Examiner* — Anh Vu H Ly
(74) *Attorney, Agent, or Firm* — Paul M. McAdams; Holland & Hart LLP

(57) ABSTRACT

Methods, systems, and devices for wireless communications are described. The described techniques provide for a user equipment (UE) to identify a first set of scheduled transmissions to be received using a first set of time-frequency resources, where reference signals of the first set of transmissions may be bundled according to a first reference signal bundling pattern. The UE may identify a second scheduled transmission to be received using a second set of time-frequency resources that overlaps with the first set of resources. The UE may determine a second reference signal bundling pattern for bundling the reference signals received in the first set of transmissions. For example, the UE may modify the first reference signal bundling pattern to determine the second reference signal bundling pattern. The UE may receive the second scheduled transmission and the first set of scheduled transmissions according to the second reference signal bundling pattern.

30 Claims, 12 Drawing Sheets

(56) References Cited

U.S. PATENT DOCUMENTS

| | | | | |
|---|---|---|---|---|
| 2014/0226541 | A1* | 8/2014 | Xu | H04W 56/0015 |
| | | | | 370/336 |
| 2015/0373694 | A1 | 12/2015 | You et al. | |
| 2019/0159181 | A1* | 5/2019 | Manolakos | H04W 72/23 |
| 2020/0266956 | A1* | 8/2020 | Chen | H04L 5/0007 |
| 2023/0080106 | A1* | 3/2023 | Ji | H04L 5/0094 |
| | | | | 370/330 |

OTHER PUBLICATIONS

Vivo: "Further Discussion on Multi-TRP/Panel Transmission", 3GPP Draft, 3GPP TSG RAN WG1 #97, R1-1906159_Further Discussion on Multi-TRP/Panel Transmission_Final, 3rd Generation Partnership Project (3GPP), Mobile Competence Centre, 650, Route Des Lucioles, F-06921 Sophia-Antipolis Cedex, France, vol. RAN WG1, No. Reno. USA, May 13, 2019-May 17, 2019, May 4, 2019 (May 4, 2019), XP051708200, 18 pages, Retrieved from the Internet: URL: http://www.3gpp.org/ftp/tsg%5Fran/WG1%5FRL1/TSGR1%5F97/Docs/R1%2D1906159%2Ezip, [retrieved on May 4, 2019], chapters 2. 3.1. 4.1.3. 5-7, Section 2.1. 3.1, pp. 12-15, 5. PUCCH for Multi-TRP.

* cited by examiner

SHARED CHANNEL REFERENCE SIGNAL BUNDLING AND MULTIPLE CONCURRENT SHARED CHANNEL TRANSMISSIONS

CROSS REFERENCE

The present application is a 371 national stage filing of International PCT Application No. PCT/US2021/020892 by MANOLAKOS et al. entitled "SHARED CHANNEL REFERENCE SIGNAL BUNDLING AND MULTIPLE CONCURRENT SHARED CHANNEL TRANSMISSIONS," filed Mar. 4, 2021; and claims priority to Greek Patent Application No. 20200100122 by MANOLAKOS et al., entitled "SHARED CHANNEL REFERENCE SIGNAL BUNDLING AND MULTIPLE CONCURRENT SHARED CHANNEL TRANSMISSIONS," filed Mar. 5, 2020, each of which is assigned to the assignee hereof, and each of which is expressly incorporated by reference in its entirety herein.

FIELD OF TECHNOLOGY

The following relates generally to wireless communications and more specifically to shared channel reference signal bundling and multiple concurrent shared channel transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station and a UE may transmit and receive various reference signals associated with data channel transmissions, such as demodulation reference signals (DMRSs). The UE may use DMRSs to estimate channel characteristics of the data channel, and the UE may use the estimated channel characteristics to perform demodulation or decoding of transmissions communicated over the estimated channel. In some cases, a bundling configuration may indicate that the UE is to group one or more reference signals (e.g., DMRSs) of multiple transmissions across a time interval.

SUMMARY

The described techniques relate to improved methods, systems, devices, and apparatuses that support shared channel reference signal bundling and multiple concurrent shared channel transmissions. The described techniques provide for a user equipment (UE) to identify a first set of scheduled transmissions to be received using a set of time-frequency resources on a shared channel (e.g., a set of physical downlink shared channel (PDSCH) transmissions), where reference signals (e.g., demodulation reference signals (DMRSs)) of the first set of transmissions may be bundled according to a first reference signal bundling pattern. For example, a base station may schedule the first set of downlink transmissions for the UE, and the base station may signal a bundling configuration to the UE including the first reference signal bundling pattern (e.g., via downlink control information (DCI)). Additionally, the UE may identify a second scheduled transmission to be received using a set of time-frequency resources on the shared channel that at least partially overlaps (e.g., in time and/or frequency) the resources for the first set of scheduled transmissions.

The UE may determine a second reference signal bundling pattern for bundling the DMRSs received in the first set of scheduled transmissions. For example, the UE may modify the first reference signal bundling pattern to determine the second reference signal bundling pattern (e.g., based on capabilities of the UE to receive simultaneous transmissions and whether the simultaneous transmissions are scheduled for overlapping sets of frequency resources in addition to overlapping sets of time resources). In some cases, the UE may determine not to bundle the first set of scheduled transmissions, and the UE may individually process each transmission of the first set of scheduled transmissions (e.g., according to their respective DMRSs). Alternatively, the UE may determine to modify the first bundling pattern to bundle DMRSs, for example, of the transmissions received before the overlapping transmissions, of the transmissions received after the overlapping transmissions, or both. The UE may then receive the second scheduled transmission and at least a subset of the first set of scheduled transmissions according to the determined second reference signal bundling pattern.

A method of wireless communication at a UE is described. The method may include identifying a first set of scheduled transmissions for a shared channel, the first set of scheduled transmissions associated with a first reference signal bundling pattern, identifying a second scheduled transmission for the shared channel that at least partially overlaps in time with at least one transmission of the first set of scheduled transmissions, determining a second reference signal bundling pattern for the first set of scheduled transmissions based on identifying the second scheduled transmission, receiving at least a subset of the first set of scheduled transmissions via the shared channel based on the second reference signal bundling pattern, and receiving the second scheduled transmission via the shared channel.

An apparatus for wireless communication at a UE is described. The apparatus may include a processor, memory coupled with the processor, and instructions stored in the memory. The instructions may be executable by the processor to cause the apparatus to identify a first set of scheduled transmissions for a shared channel, the first set of scheduled transmissions associated with a first reference signal bundling pattern, identify a second scheduled transmission for the shared channel that at least partially overlaps in time with at least one transmission of the first set of scheduled transmissions, determine a second reference signal bundling pattern for the first set of scheduled transmissions based on identifying the second scheduled transmission, receive at least a subset of the first set of scheduled transmissions via the shared channel based on the second reference signal bundling pattern, and receive the second scheduled transmission via the shared channel.

Another apparatus for wireless communication at a UE is described. The apparatus may include means for identifying a first set of scheduled transmissions for a shared channel, the first set of scheduled transmissions associated with a first reference signal bundling pattern, identifying a second scheduled transmission for the shared channel that at least partially overlaps in time with at least one transmission of the first set of scheduled transmissions, determining a second reference signal bundling pattern for the first set of scheduled transmissions based on identifying the second scheduled transmission, receiving at least a subset of the first set of scheduled transmissions via the shared channel based on the second reference signal bundling pattern, and receiving the second scheduled transmission via the shared channel.

A non-transitory computer-readable medium storing code for wireless communication at a UE is described. The code may include instructions executable by a processor to identify a first set of scheduled transmissions for a shared channel, the first set of scheduled transmissions associated with a first reference signal bundling pattern, identify a second scheduled transmission for the shared channel that at least partially overlaps in time with at least one transmission of the first set of scheduled transmissions, determine a second reference signal bundling pattern for the first set of scheduled transmissions based on identifying the second scheduled transmission, receive at least a subset of the first set of scheduled transmissions via the shared channel based on the second reference signal bundling pattern, and receive the second scheduled transmission via the shared channel.

In some examples of the method, apparatuses, and non-transitory computer-readable medium described herein, determining the second reference signal bundling pattern may include operations, features, means, or instructions for determining to process the reference signals of each of the first set of scheduled transmissions individually.

In some examples of the method, apparatuses, and non-transitory computer-readable medium described herein, determining the second reference signal bundling pattern may include operations, features, means, or instructions for determining that the second scheduled transmission overlaps in time with a reference signal of the at least one transmission of the first set of scheduled transmissions.

In some examples of the method, apparatuses, and non-transitory computer-readable medium described herein, determining the second reference signal bundling pattern may include operations, features, means, or instructions for determining to bundle reference signals across a subset of the first set of scheduled transmissions.

In some examples of the method, apparatuses, and non-transitory computer-readable medium described herein, the bundled reference signals include at least one reference signal of a scheduled transmission of the at least one transmission of the first set of scheduled transmissions, the scheduled transmission at least partially overlapping with the second scheduled transmission.

In some examples of the method, apparatuses, and non-transitory computer-readable medium described herein, the bundled reference signals exclude reference signals of scheduled transmissions that at least partially overlap with the second scheduled transmission.

In some examples of the method, apparatuses, and non-transitory computer-readable medium described herein, the bundled reference signals of the subset of the first set of scheduled transmissions may be scheduled prior to the second scheduled transmission.

In some examples of the method, apparatuses, and non-transitory computer-readable medium described herein, the bundled reference signals of the subset of the first set of scheduled transmissions may be scheduled after the second scheduled transmission.

In some examples of the method, apparatuses, and non-transitory computer-readable medium described herein, determining the second reference signal bundling pattern may include operations, features, means, or instructions for modifying the first reference signal bundling pattern to obtain the second reference signal bundling pattern based on a capability of the UE for receiving the second scheduled transmission and the at least one transmission of the first set of scheduled transmissions.

In some examples of the method, apparatuses, and non-transitory computer-readable medium described herein, determining the second reference signal bundling pattern may include operations, features, means, or instructions for modifying the first reference signal bundling pattern based on determining that at least a portion of frequency resources associated with the second scheduled transmission do not overlap with frequency resources associated with the at least one transmission of the first set of scheduled transmissions.

In some examples of the method, apparatuses, and non-transitory computer-readable medium described herein, determining the second reference signal bundling pattern may include operations, features, means, or instructions for determining the second reference signal bundling pattern to be the same as the first reference signal bundling pattern based on determining that frequency resources associated with the at least one transmission of the first set of scheduled transmissions fully overlap with frequency resources associated with the second scheduled transmission.

In some examples of the method, apparatuses, and non-transitory computer-readable medium described herein, the first set of scheduled transmissions may be transmitted from a first transmitter and the second scheduled transmission may be transmitted from a second transmitter.

Some examples of the method, apparatuses, and non-transitory computer-readable medium described herein may further include operations, features, means, or instructions for receiving a bundling configuration, where determining the second reference signal bundling pattern for the first set of scheduled transmissions may be based on the bundling configuration.

Some examples of the method, apparatuses, and non-transitory computer-readable medium described herein may further include operations, features, means, or instructions for identifying a bundling capability of the UE, where determining the second reference signal bundling pattern for the first set of scheduled transmissions may be based on the bundling capability of the UE.

DETAILED DESCRIPTION

Figure 1:
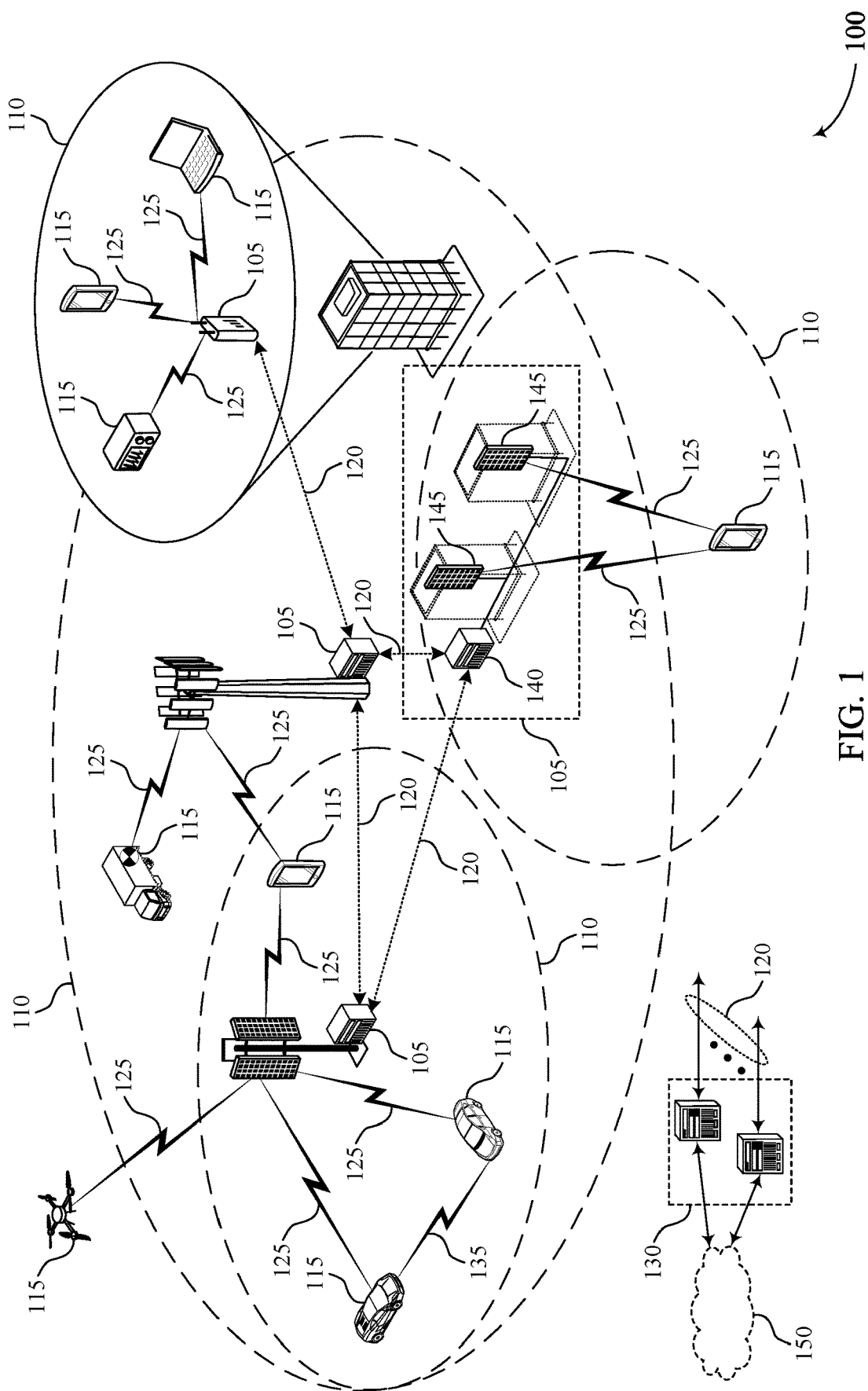
FIG. 1 illustrates an example of a wireless communications system that supports shared channel reference signal bundling and multiple concurrent shared channel transmissions in accordance with aspects of the present disclosure.

In some deployments, a base station may transmit reference signals to a user equipment (UE), where reference signals may be associated with corresponding data channel transmissions. For example, the base station may transmit demodulation reference signals (DMRSs) to the UE, and the UE may use the DMRSs to estimate channel characteristics (e.g., via channel quality measurements) of corresponding wireless channels over which the base station and the UE may communicate (e.g., channels on which the base station may have scheduled the UE to communicate with the base station). The UE may accordingly use the estimated channel characteristics based on the DMRSs to demodulate transmissions received from the base station.

In some cases, the base station may schedule multiple communications with the UE, and the base station may indicate a bundling configuration to the UE associated with the scheduled communications. The bundling configuration may indicate, for example, that the UE is to group DMRSs of the scheduled transmissions according to the bundling configuration, for example, to group DMRSs between multiple transmissions over a corresponding set of time resources. The UE may then use the grouped DMRSs to perform channel estimation to demodulate transmissions received from the base station on the respective channel or channels.

In some cases, the base station may schedule the UE to receive a first set of transmissions according to a bundling configuration also signaled to the UE, and a second transmission (or set of transmissions), where the second transmission may overlap in time and/or frequency with one or more transmissions of the first set of transmissions (e.g., occupying at least partially overlapping sets of time-frequency resources). For example, the base station may schedule the second transmission to use time resources that at least partially overlap a set of time resources scheduled for the first set of transmissions. In some cases, the second set of transmissions may use frequency resources that at least partially overlap with a set of frequency resources scheduled for the first set of transmissions. In other cases, the frequency resources of the first set of transmissions and the second transmission may not overlap.

Techniques are provided herein by which the UE may determine a bundling pattern for bundling reference signal (e.g., DMRS) transmissions for such situations. For example, the UE may determine not to apply bundling and may accordingly perform channel estimation for each of the transmissions individually. Alternatively, the UE may determine to modify the received bundling configuration, based on, for example, capabilities of the UE and the manner in which the resources for the second transmission overlap with the resources for the first set of transmissions. For example, based on whether the UE has a capability to receive bundled transmissions and a simultaneous overlapping transmission (e.g., that may or may not overlap in the frequency domain as well as the time domain). If, for example, the UE does not have a capability to receive the simultaneous (e.g., colliding) transmissions, the UE may modify the bundling configuration to suppress bundling of DMRSs, or to bundle DMRSs for transmissions including DMRSs before the colliding transmissions, for transmissions including DMRSs after the colliding transmissions, or both.

Aspects of the disclosure are initially described in the context of wireless communications systems. Examples of transmission timelines and a process flow are then described. Aspects of the disclosure are further illustrated by and described with reference to apparatus diagrams, system diagrams, and flowcharts that relate to shared channel reference signal bundling and multiple concurrent shared channel transmissions.

FIG. 1 illustrates an example of a wireless communications system 100 that supports shared channel reference signal bundling and multiple concurrent shared channel transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 and a UE 115 may communicate reference signals associated with data channel transmissions, such as DMRSs. For example, the UE 115 may use the DMRSs to estimate channel characteristics (e.g., via channel quality measurements) of wireless channels over which the base station 105 and the UE 115 communicate data. The UE 115 may use estimated channel characteristics from the DMRSs to demodulate transmissions received from the base station 105 or decode the associated channel. For example, the base station 105 may transmit one or more DMRSs to the UE 115 in each of one or more TTIs (e.g., scheduling units such as slots, mini-slots, a combination of slots and mini-slots, frames, subframes, symbol groups, etc.).

In some cases, the base station 105 may schedule multiple communications with the UE 115, and the base station 105 may indicate a bundling configuration to the UE 115 associated with one or more scheduled transmissions. The bundling configuration may indicate, for example, that the UE 115 is to group one or more reference signals (e.g., DMRSs) of the scheduled transmissions according to the corresponding bundling configuration for the DMRS (e.g., a DMRS bundling configuration) across a group of one or more TTIs in the time domain. The UE 115 may then use the group of multiple DMRSs to perform channel estimation for demodulating transmissions received from the base station 105. This may provide potential performance improvements, for example, to provide coverage enhancement, for improved channel estimation performance in relatively high mobility scenarios, to decrease an amount of signaling overhead used to communicate DMRSs which may corresponding increase a peak throughput, and other like benefits.

In some cases, a bundling configuration for time domain DMRS bundling may indicate a slot-level aggregation of downlink TTIs, for example, across one or more downlink slots. In some cases, the bundling configuration may signaled in one slot and may be applied for one or more subsequent slots. In some cases, DMRSs may be associated with downlink data transmissions (e.g., over physical downlink shared channel (PDSCH)) using a particular instance of a physical channel (e.g., corresponding to a particular antenna port).

In some cases, the base station may schedule a UE to receive a first set of bundled transmissions (e.g., according to a particular bundling configuring), and the base station may schedule the UE to receive a second transmission (or set of transmissions), where the second transmission may overlap in time and/or frequency with one or more transmissions of the first set of transmissions (e.g., occupying overlapping sets of time-frequency resources). For example, the base station may schedule the second transmission to use a set of resources overlapping in time with the set of resources with which the base station scheduled the first set of transmissions, but the set of resources of the second transmission may not overlap in frequency with the set of resources for the first set of transmissions. Alternatively, the base station may schedule the second transmission to use a set of resources that overlaps in both time and frequency with the set of resources with which the base station scheduled the first set of transmissions. In some examples, the second transmission may puncture one or more transmissions of the first set of transmissions. In other examples, the second transmission may be spatially separated or processed (e.g., a different spatial layer, a different beam, a different TRP) such that a UE could concurrently receive the second transmission and a transmission of the first set of transmissions. Techniques are provided herein by which the UE may determine how to apply DMRS bundling for such situations. For example, the UE may determine not to apply bundling and accordingly perform channel estimation for each of the transmissions individually. Alternatively, the UE may determine to, for example, modify a bundling configuration to bundle DMRSs received before and/or after the overlapping transmissions.

Figure 2:
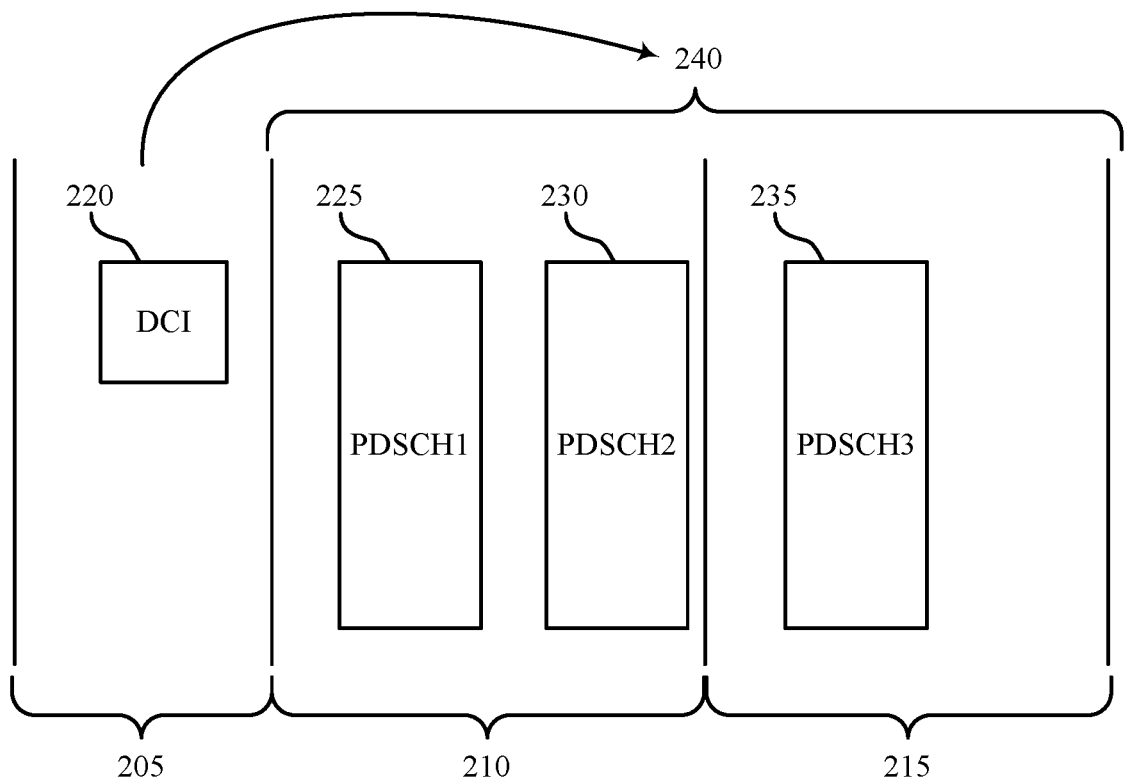
FIG. 2 illustrates an example of a transmission timeline that supports shared channel reference signal bundling and multiple concurrent shared channel transmissions in accordance with aspects of the present disclosure.

FIG. 2 illustrates an example of a transmission timeline 200 that supports shared channel reference signal bundling and multiple concurrent shared channel transmissions in accordance with aspects of the present disclosure. In some examples, the transmission timeline 200 may implement aspects of the wireless communications system 100 as described with reference to FIG. 1. The transmission timeline 200 illustrates procedures for a first technique for reference signal bundling (e.g., DMRS bundling) to facilitate communications between a base station and a UE, which may be examples of the corresponding devices as described with reference to FIG. 1.

The transmission timeline 200 shows communications between the UE and the base station over a channel including a number of TTIs (e.g., slots), including a first slot 205, a second slot 210, and a third slot 215. In other implementations, the TTIs may include, for example, any type of scheduling units for wireless communications, such as slots, mini-slots, a combination of slots and mini-slots, frames, subframes, symbol groups, and the like. The example transmission timeline 200 of FIG. 2 shows three slots, but it is it be understood that the techniques described herein may be similarly applied across any greater or lesser number of slots.

The base station and the UE may communicate uplink and downlink transmissions during each of the slots. For example, during the first slot 205, the base station may transmit control signaling to the UE (via, e.g., DCI 220). The base station may also transmit downlink data transmissions to the UE (e.g., in a number of PDSCH transmissions). For example, during the second slot 210, the base station may transmit to the UE a first PDSCH transmission 225 (e.g., shown as PDSCH1) and a second PDSCH transmission 230 (e.g., shown as PDSCH2). During the third slot 215, the base station may transmit to the UE a third PDSCH 235 transmission (e.g., shown as PDSCH3). The In some cases, for example, as shown in the example transmission timeline 200 of FIG. 2, the DCI 220 may indicate that the UE is to use "look-ahead" DMRS bundling. In look-ahead DMRS bundling, the DCI 220 may indicate a bundling configuration for a set of bundled transmissions 240 that are subsequent to the slot in which the UE receives the DCI 220. For example, as shown in FIG. 2, the UE may receive the DCI 220 in the first slot 205, and the DCI may indicate that the bundled transmissions 240 are to include transmissions in the two slots following the first slot 205 in which the UE receives the DCI 220 (e.g., indicating that the bundled transmissions 240 are to include the DMRS transmissions of the second slot 210 and the third slot 215). In this way, the base station may dynamically indicate bundling configurations to the UE for upcoming communications.

Accordingly, the UE may perform channel estimation using DMRS included in each of the PDSCH transmissions of the second slot 210 and the third slot 215. As shown in FIG. 2, the UE may perform channel estimation using the DMRS received in each of the first PDSCH transmission 225, the second PDSCH transmission 230, and the third PDSCH transmission 235.

In some cases, the base station may schedule a first set of transmissions (e.g., the first through third PDSCH transmissions shown in FIG. 2) and a second transmission (or set of transmissions), where the second transmission may overlap in time and/or frequency with one or more transmissions of the first set of transmissions (e.g., occupying overlapping sets of time-frequency resources). For example, the base station may schedule the second transmission to use a set of resources overlapping in time with the set of resources with which the base station scheduled the first set of transmissions, but the set of resources of the second transmission may not overlap in frequency with the set of resources for the first set of transmissions. Alternatively, the base station may schedule the second transmission to use a set of resources that overlaps in both time and frequency with the set of resources with which the base station scheduled the first set of transmissions.

In some cases, certain scheduling constraints may be imposed for the PDSCH transmissions (e.g., to limit an operational complexity at the UE). For example, in some cases, a UE may support receiving control signaling in multiple physical downlink control channels (PDCCHs) corresponding to multiple TRPs and/or multiple antenna panels. For such a UE that supports multiple-PDCCH based multi-TRP/panel transmission, and where each of multiple PDCCH transmissions may schedule a corresponding PDSCH transmission (e.g., for eMBB with a non-ideal backhaul link), one or more scheduling restrictions may be imposed for the UE. For example, the UE may be scheduled to receive multiple PDSCH transmissions that do not overlap in time and frequency, that partially overlap in time and/or frequency, or that fully overlap in time and/or frequency, and the UE may be configured with one or more scheduling rules or constraints (e.g., scheduling restrictions) for such scenarios.

For example, a scheduling rule may establish that the UE is not expected to use different DMRS configuration for front-loaded DMRS symbols (e.g., for DMRS transmissions), additional DMRS transmissions, and/or DMRS symbol location and DMRS configuration type (e.g., if the UE may be scheduled to receive fully or partially overlapping PDSCHs). Additionally or alternatively, a scheduling rule may establish that the UE is not expected to use more than one transmission configuration indication (TCI) index (e.g., indicating a TCI state for one or more antennas of the UE and/or quasi-co-location (QCL) configuration) for DMRS ports within a same coded group (e.g., code division multiplexing (CDM) group) of transmissions (e.g., for PDSCH transmissions scheduled to use fully and/or partially overlapping sets of time-frequency resources). Additionally or alternatively, a scheduling rule may establish that the UE is to apply full scheduling information to receive a particular PDSCH only according to a corresponding PDCCH transmission (e.g., to not apply conflicting scheduling information of other PDCCH transmissions). Additionally or alternatively, a scheduling rule may establish that the UE is expected to be scheduled to use a same active BWP bandwidth and a same subcarrier spacing for respective PDSCH transmissions of multiple overlapping PDSCH transmissions at a given time resource. In some cases, a scheduling rule may establish that the UE is to apply a number (e.g., 1) of active BWPs per component carrier.

In some cases, the UE may be configured by a higher layer parameter (e.g., a PDCCH-Config parameter) that includes multiple different values (e.g., two different values) for a location of control resource information (e.g., configured with different values for a CORESETPoolIndex parameter in ControlResourceSet values) for an active BWP of a serving cell. In such cases, a scheduling rule may establish that the UE is expected to receive multiple PDCCHs that are scheduled to use overlapping sets of resources (e.g., in time and/or frequency) according to a UE capability. Accordingly, a UE may not be configured either to use either joint HARQ-ACK feedback or separate HARQ-ACK feedback for the transmissions, and the UE may instead provide such joint or separate HARQ-ACK feedback according to a UE capability or the resource configuration. In some cases, control information may not provide a location (e.g., a CORESET may not include a value for a CORESETPoolIndex parameter). In such cases, the UE may, for example, used a configured value, such as a value of zero for the CORESETPoolIndex parameter.

In some cases in which multiple different TRPs and/or panels may be scheduled to transmit to the UE according to multiple PDCCH transmissions, the UE may be configured to provide separate ACK/NACK feedback for each of the respectively scheduled transmissions. In some such cases, the UE may be configured to not expect physical uplink control channel (PUCCH)-physical uplink shared channel (PUSCH) collisions from different TRPs, and scheduling implementations may be used to prevent such collisions (e.g., where the UE does not expect overlapping PUCCHs/PUSCHs transmission toward different TRPs). In some such cases, however, the UE may be configured with one or more multiplexing rules for transmissions corresponding uplink information using PUCCH and PUSCH. In some cases, resources for PUCCH transmissions may be associated with values (e.g., indices) of a higher layer index on a per-CORESET basis. In this way, the indices may be used to differentiate TRPs to determine whether transmission resources may overlap for different respective TRPs. In some cases, PUSCH transmissions may be differentiated by scheduling control information (e.g., the CORESET) in terms of a particular targeted TRP.

In accordance with one or more of the above scheduling constraints and rules, techniques are provided herein by which the UE may determine how to apply DMRS bundling for situations in which the UE receives a scheduled transmission overlapping with a scheduled set of transmissions associated with DMRS bundling. For example, the UE may determine not to apply bundling and accordingly perform channel estimation for each of the transmissions individually. Alternatively, the UE may determine to, for example, modify a bundling configuration to bundle DMRSs received before and/or after the overlapping transmissions.

Figure 3:
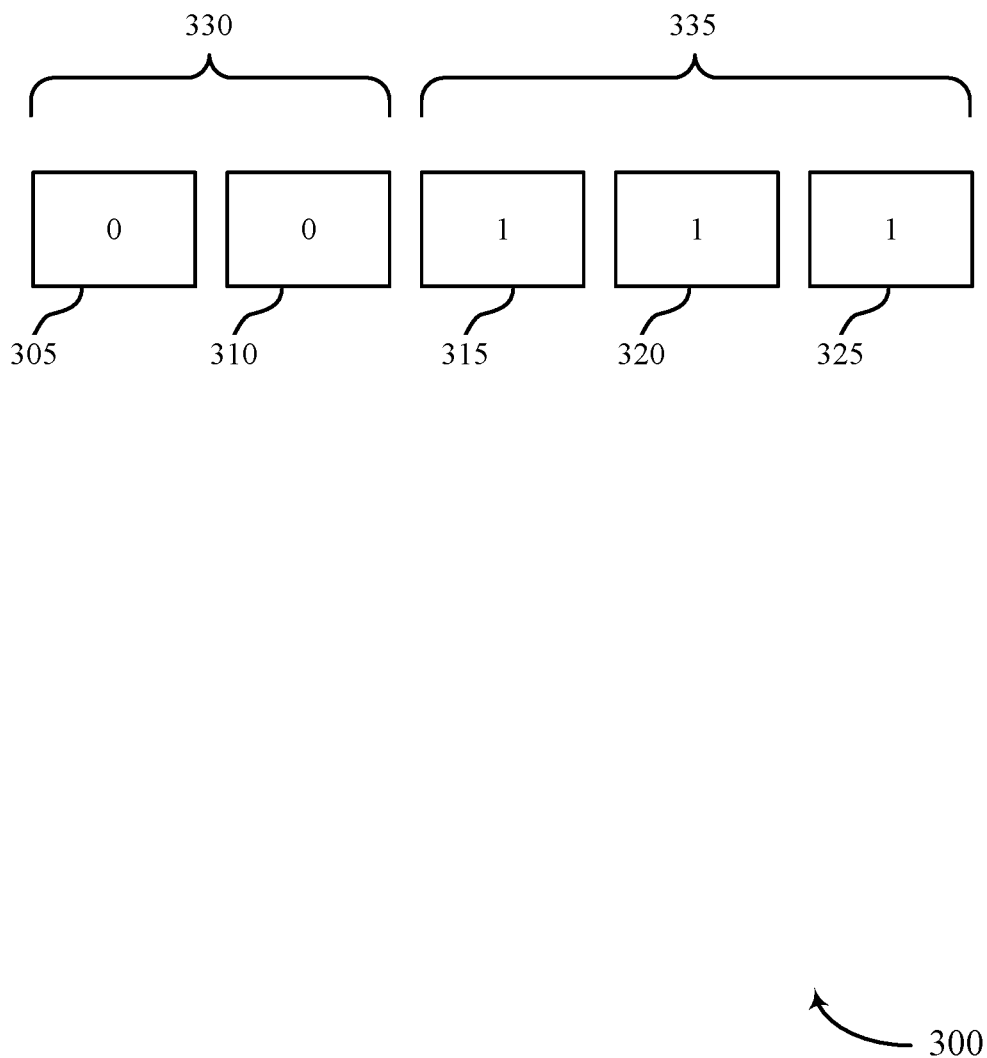
FIG. 3 illustrates an example of a transmission timeline that supports shared channel reference signal bundling and multiple concurrent shared channel transmissions in accordance with aspects of the present disclosure.

FIG. 3 illustrates an example of a transmission timeline 300 that supports shared channel reference signal bundling and multiple concurrent shared channel transmissions in accordance with aspects of the present disclosure. In some examples, the transmission timeline 300 may implement aspects of the wireless communications system 100 as described with reference to FIG. 1. In some examples, the transmission timeline 300 may implement aspects of the transmission timeline 200 as described with reference to FIG. 2. The transmission timeline 300 illustrates procedures for a second technique for reference signal bundling (e.g., DMRS bundling) to facilitate communications between a base station and a UE, which may be examples of the corresponding devices as described with reference to FIGS. 1 and 2.

The transmission timeline 300 shows communications between the UE and the base station over a channel including one or more TTIs (e.g., slots) during which the base station and the UE may communicate uplink and downlink transmissions. For example, across one or more slots, the base station may transmit control signaling and downlink data transmissions to the UE in a number of PDSCH transmissions. The transmission timeline 300 shows a first PDSCH transmission 305, a second PDSCH transmission 310, a third PDSCH transmission 315, a fourth PDSCH transmission 320, and a fifth PDSCH transmission 325. Each of the PDSCH transmissions may also be associated with control signaling (e.g., DCI).

In some cases, for example, as shown in the example transmission timeline 300 of FIG. 3, the DCI of each of the PDSCH transmissions may include one or more DCI bits (e.g., a single DCI bit) that the UE may use for "look-back" DMRS bundling. In look-back DMRS bundling, a DCI bit may be toggled to indicate a new set of bundled transmissions 240 starting at the slot in which the UE receives the DCI. For example, as shown in FIG. 3, for the sequence of the first to fifth PDSCH transmissions, corresponding DCI bits for each of the PDSCH transmissions may indicate values of 0, 0, 1, 1, and 1, respectively. Accordingly, when the DCI bit for a PDSCH transmission is different than a DCI bit of the prior PDSCH transmission, the DCI bit may indicate that the corresponding PDSCH transmission is not bundled with the previous PDSCH transmission. Likewise, when the DCI bit for a PDSCH transmission the same as a DCI bit of the prior PDSCH transmission, the DCI bit may indicate that the corresponding PDSCH transmission is bundled with the previous PDSCH transmission. In this way, the base station may dynamically indicate bundling configurations to the UE for upcoming communications.

Accordingly, as shown in FIG. 2, the DCI bits of the first PDSCH transmission 305 and the second PDSCH transmission 310 are both set to a value of "0," indicating that the first PDSCH transmission 305 and the second PDSCH transmission 310 are to be bundled in a first set of bundled transmissions 330. Then, as shown in FIG. 2, the DCI bit may change to a value of "1" for the third PDSCH transmission 315 based on the changed value for the DCI bit (e.g., from "0" to "1"). The fourth PDSCH transmission 320 and the fifth PDSCH transmission 325 may also have corresponding DCI bits that have values of "1." Accordingly, the UE may determine that a new bundle is to begin at the third PDSCH transmission 315, where a second set of bundled transmission 335 may include the third PDSCH transmission 315, the fourth PDSCH transmission 320, and the fifth PDSCH transmission 325. The UE may perform channel estimation using DMRS included in each of the PDSCH transmissions the respective bundles. For example, as shown in FIG. 3, the UE may perform channel estimation using the DMRS received in the first set of bundled transmissions 330 including the first PDSCH transmission 305 and the second PDSCH transmission 310. The UE may then separately perform additional channel estimation using the DMRS received in the second set of bundled transmissions 335 including the third PDSCH transmission 315, the fourth PDSCH transmission 320, and the fifth PDSCH transmission 325. In this way, the base station may dynamically indicate bundling configurations to the UE for upcoming communications.

In some cases, the base station may schedule a first set of transmissions (e.g., the first through fifth PDSCH transmissions shown in FIG. 3) and a second transmission (or set of transmissions), where the second transmission may overlap in time and/or frequency with one or more transmissions of the first set of transmissions (e.g., occupying overlapping sets of time-frequency resources). For example, the base station may schedule the second transmission to use resources overlapping in time with a set of resources with which the base station scheduled the first set of transmissions, but the second transmission may be scheduled to occupy resources that do not overlap in frequency with the set of resources for the first set of transmissions. Alternatively, the base station may schedule the second transmission to use resources that overlap in both time and frequency with the set of resources with which the base station scheduled the first set of transmissions. Techniques are provided herein by which the UE may determine how to apply DMRS bundling for such situations. For example, the UE may determine not to apply bundling and accordingly perform channel estimation for each of the transmissions individually. Alternatively, the UE may determine to, for example, modify a bundling configuration to bundle DMRSs received before and/or after the overlapping transmissions.

Figure 4:
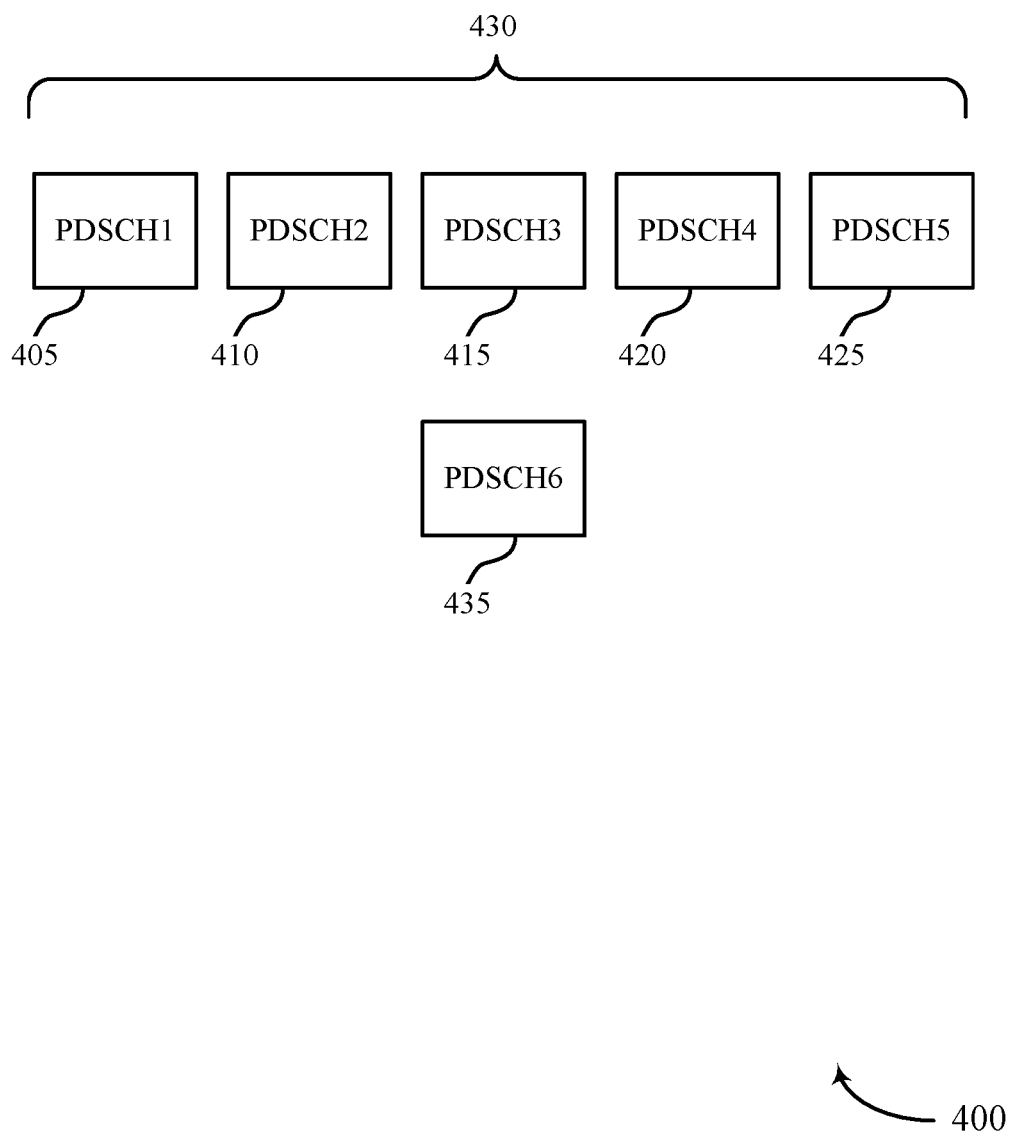
FIG. 4 illustrates an example of a transmission timeline that supports shared channel reference signal bundling and multiple concurrent shared channel transmissions in accordance with aspects of the present disclosure.

FIG. 4 illustrates an example of a transmission timeline 400 that supports shared channel reference signal bundling and multiple concurrent shared channel transmissions in accordance with aspects of the present disclosure. In some examples, the transmission timeline 400 may implement aspects of the wireless communications system 100 as described with reference to FIG. 1. In some examples, the transmission timeline 400 may implement aspects of the transmission timelines as described with reference to FIGS. 2 and 3. The transmission timeline 400 illustrates an example of a transmission being scheduled to be received by a UE using resources that at least partially overlap scheduled resources for a set of bundled transmissions from a base station to the UE, which may be examples of the corresponding devices as described with reference to FIGS. 1 through 3.

The transmission timeline 400 shows communications between the UE and the base station over a channel including one or more TTIs (e.g., slots) during which the base station and the UE may communicate uplink and downlink transmissions. For example, across one or more slots, the base station may transmit control signaling and downlink data transmissions to the UE in a number of scheduled PDSCH transmissions. The transmission timeline 400 shows five PDSCH transmissions scheduled over respective sets of time-frequency resources, including a first PDSCH transmission 405, a second PDSCH transmission 410, a third PDSCH transmission 415, a fourth PDSCH transmission 420, and a fifth PDSCH transmission 425 (e.g., shown as "PDSCH1," "PDSCH2," "PDSCH3," "PDSCH4," and "PDSCH5," respectively). As shown in the example transmission timeline 400 of FIG. 4, each of the first through first PDSCH transmissions may be configured (e.g., via a first, previously received bundling configuration, e.g., received in DCI) to be processed according to a DMRS bundling pattern.

In some cases, for example, as shown in the example transmission timeline 400 of FIG. 4, the base station may schedule a sixth PDSCH transmission 435 to be transmitted from the base station to the UE, where the sixth PDSCH transmission 435 may be scheduled to use a set of time-frequency resources that at least partially overlaps with the time-frequency resources scheduled for the first set of bundled transmissions 430. For example, as shown in FIG. 4, the sixth PDSCH transmission 435 may be scheduled to use time domain resources overlapping with time domain resources for the third PDSCH transmission 415 (e.g., the sixth PDSCH transmission 435 being scheduled simultaneously with the third PDSCH transmission 415).

The UE may determine a new bundling pattern (e.g., to modify or not modify a bundling pattern indicated in the previously received bundling configuration) for such scenarios in which the UE is scheduled to receive a second transmission (e.g., the sixth PDSCH transmission 435) using resources that at least partially overlap in time and/or frequency with resources for the first set of bundled transmissions 430 (e.g., the sixth PDSCH transmission 435 may be scheduled to use resources overlapping with the third PDSCH transmission 415 of the first set of bundled transmissions 430). In some cases, the UE may determine the new bundling pattern according to a UE capability to receive simultaneous transmissions (e.g., a capability of the UE to receive the third PDSCH transmission 415 and the sixth PDSCH transmission 435 using overlapping sets of time resources).

If, for example, the UE may not be configured with a capability to receive concurrent transmissions, the UE may drop a lower priority transmission. For example, the base station may have scheduled the sixth PDSCH transmission 435 subsequently to scheduling the third PDSCH transmission 415, and thus the base station may also indicate that the sixth PDSCH transmission 435 has a higher priority than the third PDSCH transmission 415 (e.g., being of a higher priority class). Accordingly, in this example, the UE may determine to drop the third PDSCH transmission 415. However, if the UE drops an entire colliding PDSCH transmission, for example, the third PDSCH transmission 415, the UE may not be able to bundle each of the transmissions the first set of bundled transmissions 430. For example, because the first set of bundled transmissions 430 includes the third PDSCH transmission 415 (which is to be dropped), a gap in the time domain (e.g., a time gap) may be introduced. If a duration of the time gap exceeds a corresponding (e.g., previously configured) threshold, the UE may determine not to maintain the original bundling pattern. Similarly, if the duration of the time gap exceeds the corresponding threshold, the base station may also determine not to maintain the original bundling pattern.

Accordingly, several techniques are provided by which the UE may determine a new bundling pattern in such situations. For example, according to a first technique, the UE may determine that none of the PDSCH transmissions are to be processed according to the bundled DMRS transmissions. That is, the UE may individually process DMRS transmissions of each PDSCH transmission without applying any bundling for the DMRS transmissions (e.g., performing channel estimation for each PDSCH transmission using the DMRS within that transmission and without using the DMRS within other PDSCH transmissions). Additionally or alternatively, according to a second technique, the UE may determine to bundle the transmissions before the colliding transmissions. For example, according to the second technique with respect to the example transmission timeline 400 of FIG. 4, the UE may bundle DMRSs of the first PDSCH transmission 405 and the second PDSCH transmission 410 as being received before the colliding DMRS transmissions (e.g., may use the DMRS of the first PDSCH transmission 405 and the second PDSCH transmission 410 for channel estimation for receiving each of the first PDSCH transmission 405 and the second PDSCH transmission 410).

Additionally or alternatively, according to a third technique, the UE may determine to bundle the transmissions after the colliding transmissions. For example, according to the third technique with respect to the example transmission timeline 400 of FIG. 4, the UE may bundle DMRSs of the fourth PDSCH transmission 420 and the fifth PDSCH transmission 425 as being received after the colliding DMRS transmissions. Additionally or alternatively, according to a fourth technique, the UE may determine to separately bundle the transmissions before and after the colliding transmissions. For example, according to the fourth technique with respect to the example transmission timeline 400 of FIG. 4, the UE may bundle DMRSs of the first PDSCH transmission 405 and the second PDSCH transmission 410 in a first bundle, and the UE may bundle DMRS of the fourth PDSCH transmission 420 and the fifth PDSCH transmission 425 in a second bundle.

In some alternative examples, however, the UE may be configured with a capability to receive concurrent transmissions. In some cases, the UE may or may not have a capability to perform bundling for such concurrent transmissions. Accordingly, techniques are provided by which the UE may determine a new bundling pattern in such situations when the UE has one or more of these capabilities.

For example, in some cases, the UE may not be configured with a capability to perform bundling in the presence of concurrent PDSCH transmissions. Accordingly, the UE may perform bundling (or suppress bundling), for example, according to the techniques described above as if the UE were not capable of receiving concurrent transmissions. For example, the UE may individually process the DMRSs of each of the PDSCH transmissions without bundling. Alternatively, the UE may bundle DMRSs across PDSCH transmissions that are before and/or after the colliding PDSCH transmissions.

Alternatively, in some cases, the UE may be configured with a capability to perform bundling in the presence of concurrent PDSCH transmissions that do not overlap in frequency, but not may be configured with a capability to perform bundling for concurrent PDSCH transmissions that overlap in frequency. For example, in some such cases, the UE may apply the original bundling pattern despite the colliding sixth PDSCH transmission 435 if, for example, the sixth PDSCH transmission 435 does not occupy frequency resources overlapping with the third PDSCH transmission 415, but, in some cases, may not apply the original bundling pattern if the sixth PDSCH transmission 435 occupies frequency resources overlapping (e.g., partially or fully overlapping) with the third PDSCH transmission 415. In some cases, the UE may apply the original bundling pattern for overlapping sets of resources, for example, when a fast Fourier Transform (FFT) operation for receiving the respective transmissions is not modified (e.g., the transmissions occupy fully overlapping sets of resources). If, for example, the third PDSCH transmission 415 and the sixth PDSCH transmission 435 are scheduled to use overlapping sets of frequency (as well as time) resources, the UE may perform bundling (or suppress bundling), for example, according to the techniques described above as if the UE were not capable of receiving simultaneous transmissions. For example, the UE may individually process the DMRSs of each of the PDSCH transmissions without bundling. Alternatively, the UE may bundle DMRSs across PDSCH transmissions that are before and/or after the colliding PDSCH transmissions.

Alternatively, in some cases, the UE may be configured with a capability to perform bundling for simultaneous PDSCH transmissions that overlap in time and frequency. In such cases, the UE may apply the original bundling pattern despite the colliding sixth PDSCH transmission 435, for example, whether or not the sixth PDSCH transmission 435 occupies time and frequency resources that overlap with the time and frequency resources for the third PDSCH transmission 415. Accordingly, the UE may determine not to modify the original bundling pattern (e.g., the UE may process the PDSCH transmissions according to an originally indicated bundling configuration).

Figure 5A:
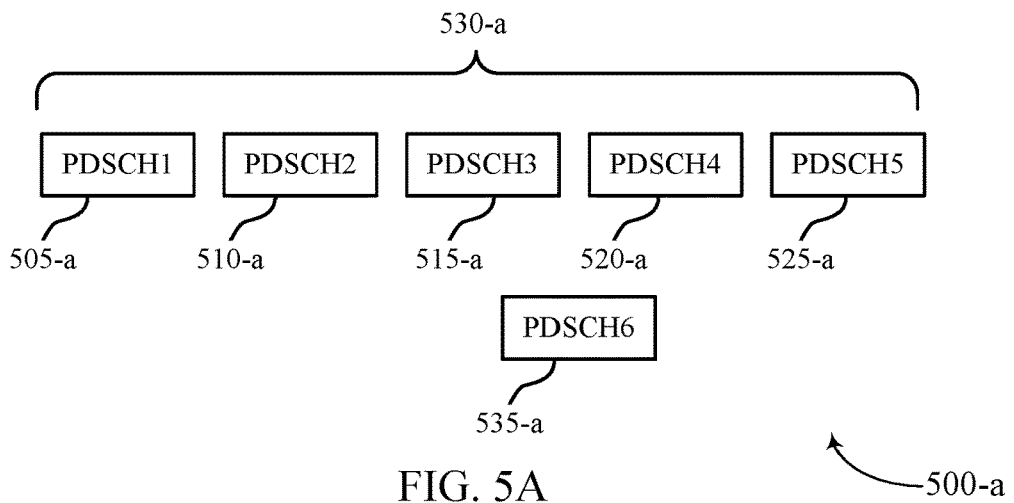
FIGS. 5A-5C illustrate example transmission timelines that support shared channel reference signal bundling and multiple concurrent shared channel transmissions in accordance with aspects of the present disclosure.
Figure 5B:
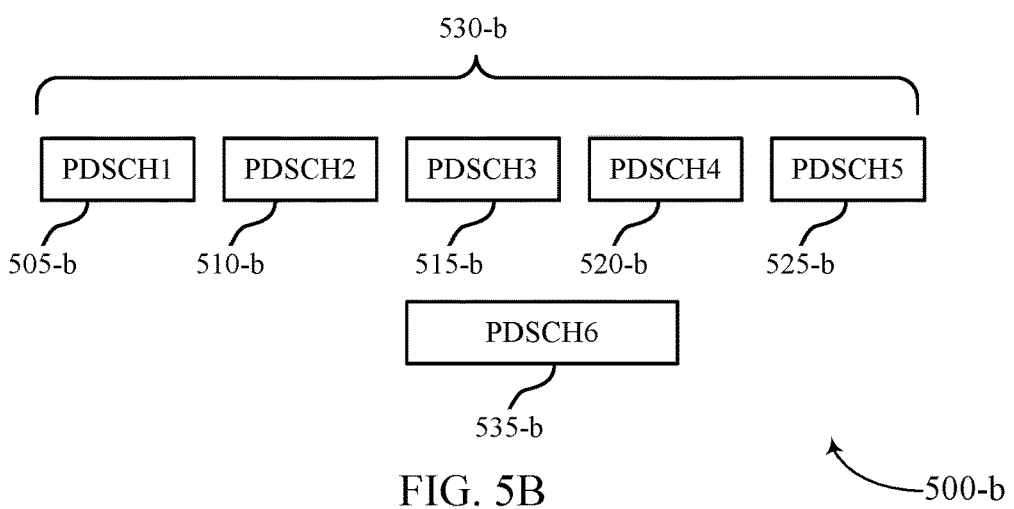
Figure 5C:
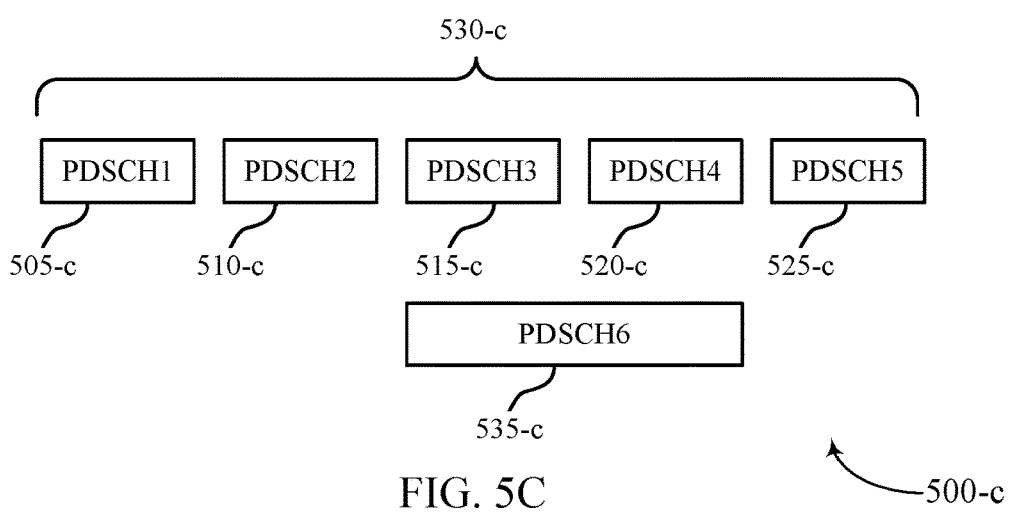

FIGS. 5A-5C illustrate example transmission timelines 500 that support shared channel reference signal bundling and multiple concurrent shared channel transmissions in accordance with aspects of the present disclosure. In some examples, the transmission timelines 500 may implement aspects of the wireless communications system 100 as described with reference to FIG. 1. In some examples, the transmission timelines 500 may implement aspects of the transmission timelines as described with reference to FIGS. 2 through 4. The transmission timelines 500 illustrate examples of transmissions being scheduled to be received by a UE using resources that at least partially overlap scheduled resources for a set of bundled transmissions from a base station to the UE, which may be examples of the corresponding devices as described with reference to FIGS. 1 through 4.

The transmission timelines 500 show communications between the UE and the base station over a channel including one or more TTIs (e.g., slots) during which the base station and the UE may communicate uplink and downlink transmissions. For example, across one or more slots, the base station may transmit control signaling and downlink data transmissions to the UE in a number of scheduled PDSCH transmissions. The transmission timelines 500 each show five PDSCH transmissions scheduled over respective sets of time-frequency resources, including a first PDSCH transmission 505, a second PDSCH transmission 510, a third PDSCH transmission 515, a fourth PDSCH transmission 520, and a fifth PDSCH transmission 525 (e.g., shown as "PDSCH1," "PDSCH2," "PDSCH3," "PDSCH4," and "PDSCH5," respectively). As shown in the example transmission timelines 500 of FIGS. 5A-C, each of the first through first PDSCH transmissions may be configured (e.g., via a first, previously received bundling configuration, e.g., received in DCI) to be processed according to a first DMRS bundling pattern.

In some cases, for example, as shown in each of the example transmission timelines 500 of FIGS. 5A-5C, the base station may schedule a sixth PDSCH transmission 535 to be transmitted from the base station to the UE, where the sixth PDSCH transmission 535 may be scheduled to use a set of time-frequency resources that at least partially overlaps with the time-frequency resources scheduled for multiple PDSCH transmissions of the first set of bundled transmissions 530. For example, as shown in each of FIGS. 5A-C, the sixth PDSCH transmission 535 may be scheduled to use time domain resources at least partially overlapping with time domain resources for the third PDSCH transmission 515 and the fourth PDSCH transmission 520. For example, in FIG. 5A, the sixth PDSCH transmission 535-a overlaps with a portion of the third PDSCH transmission 515-a and a portion of the fourth PDSCH transmission 520-a. In FIG. 5B, the sixth PDSCH transmission 535-b overlaps with the full set of time resources of the third PDSCH transmission 515-b and with a portion of the fourth PDSCH transmission 520-b. In FIG. 5C, the sixth PDSCH transmission 535-c overlaps with the full set of time resources of both of the third PDSCH transmission 515-c and the fourth PDSCH transmission 520-c.

In each of these examples, the UE may perform similar techniques as described herein for a PDSCH transmissions that collides with only a single PDSCH transmission of the first sets of bundled transmissions 530. In some cases, the UE may drop the lower priority transmissions. For example, the base station may indicate that the sixth PDSCH transmissions 535 have a higher priority than the third PDSCH transmissions 515 and/or of the fourth PDSCH transmissions 520 (e.g., being of a higher priority class). Accordingly, the UE may determine to drop the third PDSCH transmissions 515 and the fourth PDSCH transmission 520. As similarly described above, if a duration of a time gap left by dropping the third PDSCH transmissions 515 and the fourth PDSCH transmission 520 exceeds a corresponding (e.g., previously configured) threshold, the UE may determine not to maintain the original DMRS bundling pattern.

In such situations, the UE may analogously perform bundling as described above. For example, the UE may individually process the DMRSs of each of the PDSCH transmissions without bundling. Alternatively, the UE may bundle DMRSs across PDSCH transmissions that are before and/or after the colliding PDSCH transmissions (e.g., individually processing DMRS(s) of the fifth PDSCH transmissions 525 and bundling, or not bundling, DMRS transmissions of the first PDSCH transmissions 505 and the second PDSCH transmissions 510).

FIGS. 6A-6D illustrate example transmission timelines 600 that support shared channel reference signal bundling and multiple concurrent shared channel transmissions in accordance with aspects of the present disclosure. In some examples, the transmission timelines 600 may implement aspects of the wireless communications system 100 as described with reference to FIG. 1. In some examples, the transmission timelines 600 may implement aspects of the transmission timelines as described with reference to FIGS. 2 through 5A-C. The transmission timelines 600 illustrate examples of transmissions being scheduled to be received by a UE using resources that at least partially overlap scheduled resources for a set of bundled transmissions from a base station to the UE, which may be examples of the corresponding devices as described with reference to FIGS. 1 through 5A-C.

The transmission timelines 600 show communications between the UE and the base station over a channel including one or more TTIs (e.g., slots) during which the base station and the UE may communicate uplink and downlink transmissions. For example, across one or more slots, the base station may transmit control signaling and downlink data transmissions to the UE in a number of scheduled PDSCH transmissions. The transmission timelines 600 each show five PDSCH transmissions scheduled over respective sets of time-frequency resources, including a first PDSCH transmission 605, a second PDSCH transmission 610, a third PDSCH transmission 615, a fourth PDSCH transmission 620, and a fifth PDSCH transmission 625 (e.g., shown as "PDSCH1," "PDSCH2," "PDSCH3," "PDSCH4," and "PDSCH5," respectively). As shown in the example transmission timelines 600 of FIGS. 6A-D, each of the first through first PDSCH transmissions may be configured (e.g., via a first, previously received bundling configuration, e.g., received in DCI) to be processed according to a DMRS bundling pattern.

Figure 6A:
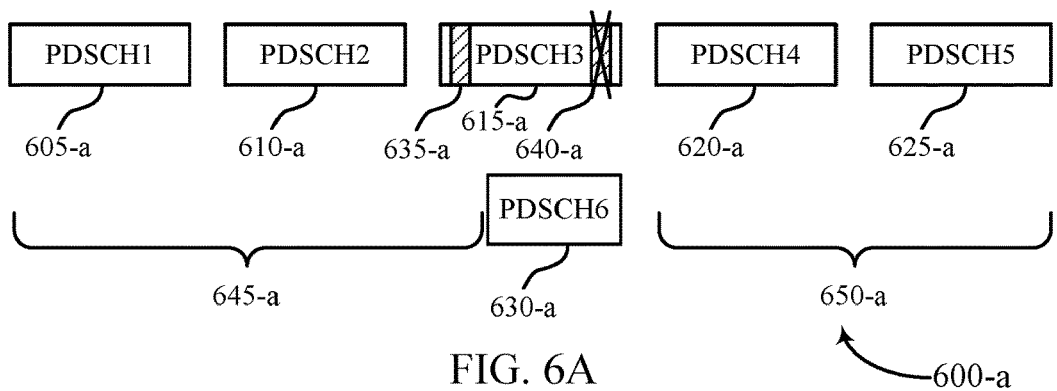
FIGS. 6A-6D illustrate example transmission timelines that support shared channel reference signal bundling and multiple concurrent shared channel transmissions in accordance with aspects of the present disclosure.
Figure 6B:
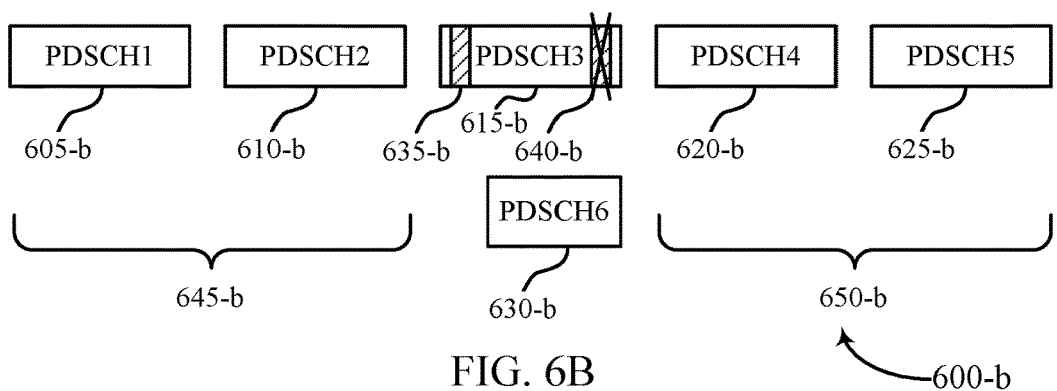
Figure 6C:
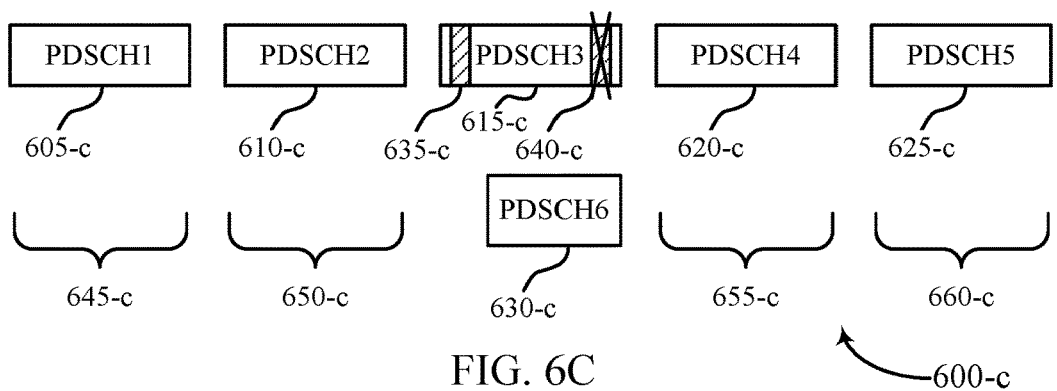
Figure 6D:
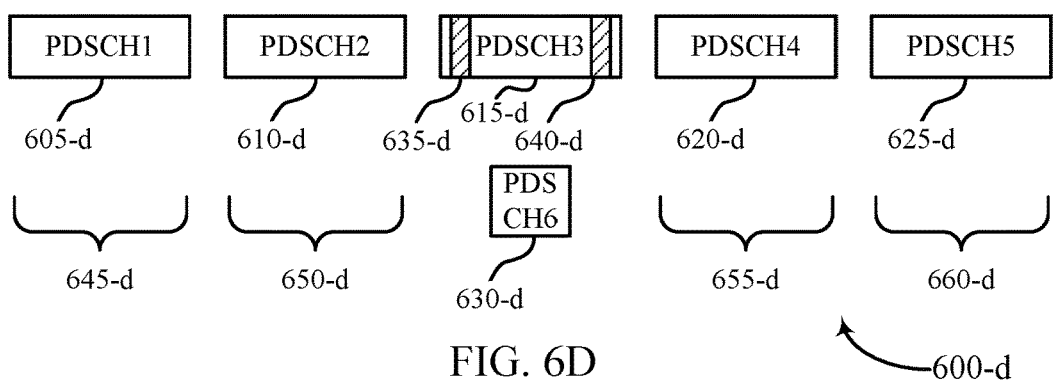

In some cases, for example, as shown in each of the example transmission timelines 600 of FIGS. 6A-D, the base station may schedule a sixth PDSCH transmission 630 to be transmitted from the base station to the UE, where the sixth PDSCH transmission 630 may be scheduled to use a set of time-frequency resources that at least partially overlaps with the time-frequency resources scheduled for at least one PDSCH transmission of the first set of transmissions configured for DMRS bundling (e.g., the first through fifth PDSCH transmissions). In some cases, the third PDSCH transmissions 615 may include one (or more) respective DMRS transmissions, for example a first DMRS transmission 635 and a second DMRS transmission 640. As shown in each of FIGS. 6A-D, the sixth PDSCH transmission 630 may be scheduled to use time domain resources at least partially overlapping with time domain resources for the third PDSCH transmission 615, and which may overlap with one of the DMRS transmissions, where, for example, FIGS. 6A, 6B, and 6C, the sixth PDSCH transmissions 630 may overlap with one DMRS transmission of the third PDSCH transmissions but not another. For example, in FIG. 6A, the sixth PDSCH transmission 630-a overlaps with a portion of the third PDSCH transmission 615-a including the second DMRS transmission 640-a but not the first DMRS transmission 635-a. In FIG. 6B, the sixth PDSCH transmission 630-b overlaps with a portion of the third PDSCH transmission 615-b including the second DMRS transmission 640-b but not the first DMRS transmission 635-b. In FIG. 6C, the sixth PDSCH transmission 630-c overlaps with a portion of the third PDSCH transmission 615-c including the second DMRS transmission 640-c but not the first DMRS transmission 635-c. In FIG. 6D, the sixth PDSCH transmission 630-d overlaps with a portion of the third PDSCH transmission 615-*d* but does not overlap with either of the first DMRS transmission 635-*d* or the second DMRS transmission 640-*d*.

In some cases, the UE may determine a bundling pattern (e.g., modified from a bundling pattern of an original bundling configuration) based on whether a colliding transmission (e.g., the sixth PDSCH transmissions 630) overlap with DMRS transmissions, for example, of bundled transmissions. In each of these examples, the UE may drop the second DMRS transmissions 640 with which the sixth PDSCH transmissions 630 collides. The UE may then perform analogous bundling adjustments as described above, for example, with reference to FIGS. 4 and 5A-C. For example, as shown in FIG. 6A, in some cases, the UE may bundle the DMRSs with which the sixth PDSCH transmission 630-*a* does not collide. For example, in a first set of bundled transmissions 645-*a*, the UE may bundle the DMRSs of the first PDSCH transmission 605-*a*, the DMRSs of the second PDSCH transmission 610-*a*, and the first DMRS 635-*a* of the third PDSCH transmission 615-*a* (e.g., the DMRS with which the sixth PDSCH transmission 630-*a* does not collide). Additionally or alternatively, in a second set of bundled transmissions 650-*a*, the UE may bundle the DMRSs of the fourth PDSCH transmission 620-*a* and the DMRSs of the fifth PDSCH transmission 625-*a*.

As shown in FIG. 6B, in some cases, the UE may bundle the DMRSs of each of the PDSCH transmissions with which the sixth PDSCH transmission 630-*b* does not collide. For example, in a first set of bundled transmissions 645-*b*, the UE may bundle the DMRSs of the first PDSCH transmission 605-*b* and the DMRSs of the second PDSCH transmission 610-*b*. Additionally or alternatively, in a second set of bundled transmissions 650-*b*, the UE may bundle the DMRSs of the fourth PDSCH transmission 620-*b* and the DMRSs of the fifth PDSCH transmission 625-*b*. In the example of FIG. 6B, the UE may not include the first DMRS 635-*a* of the third PDSCH transmission 615-*a* (e.g., the DMRS with which the sixth PDSCH transmission 630-*a* does not collide) in either set of bundled transmissions.

As shown in FIG. 6C, in some cases, the UE may not bundle the DMRSs of the PDSCH transmissions based on the sixth PDSCH transmission 630-*c* colliding with a DMRS of any of the PDSCH transmissions. For example, the UE may individually process DMRSs of each of the PDSCH transmissions (e.g., without applying bundling). As shown in FIG. 6C, the UE may process DMRSs in a first window 645-*c* including the first PDSCH transmission 605-*c*, the UE may process DMRSs in a second window 650-*c* including the second PDSCH transmission 610-*c*, the UE may process DMRSs in a third window 655-*c* including the fourth PDSCH transmission 620-*c*, and the UE may process DMRSs in a fourth window 660-*c* including the fifth PDSCH transmission 625-*c*. In some cases, for example, if the UE does not drop the third PDSCH transmission 615-*c*, the UE may process DMRSs in an additional window that includes the third PDSCH transmission 615-*c*.

As shown in FIG. 6D, in some cases, the UE may not bundle the DMRSs of the PDSCH transmissions based on the sixth PDSCH transmission 630-*d* colliding with any of the PDSCH transmissions. For example, the UE may individually process DMRSs of each of the PDSCH transmissions (e.g., without applying bundling). As shown in FIG. 6D, the UE may process DMRSs in a first window 645-*d* including the first PDSCH transmission 605-*d*, the UE may process DMRSs in a second window 650-*d* including the second PDSCH transmission 610-*d*, the UE may process DMRSs in a third window 655-*d* including the fourth PDSCH transmission 620-*d*, and the UE may process DMRSs in a fourth window 660-*d* including the fifth PDSCH transmission 625-*d*.

Alternatively, in some cases with reference to FIG. 6D, the UE may apply the bundling pattern of the original bundling configuration. For example, based on the sixth PDSCH transmission 630-*d* not colliding with any of the DMRSs of the PDSCH transmissions, the UE may, in some cases, apply the bundling pattern of the original bundling configuration and/or the UE may analogously perform bundling as described above. For example, the UE may bundle DMRSs across PDSCH transmissions that are before and/or after the colliding PDSCH transmissions (e.g., bundling DMRS transmissions of the first PDSCH transmission 605-*d* and the second PDSCH transmissions 610-*d* and/or bundling DMRS transmissions of the fourth PDSCH transmission 620-*d* and the fifth PDSCH transmissions 625-*d*).

Figure 7:
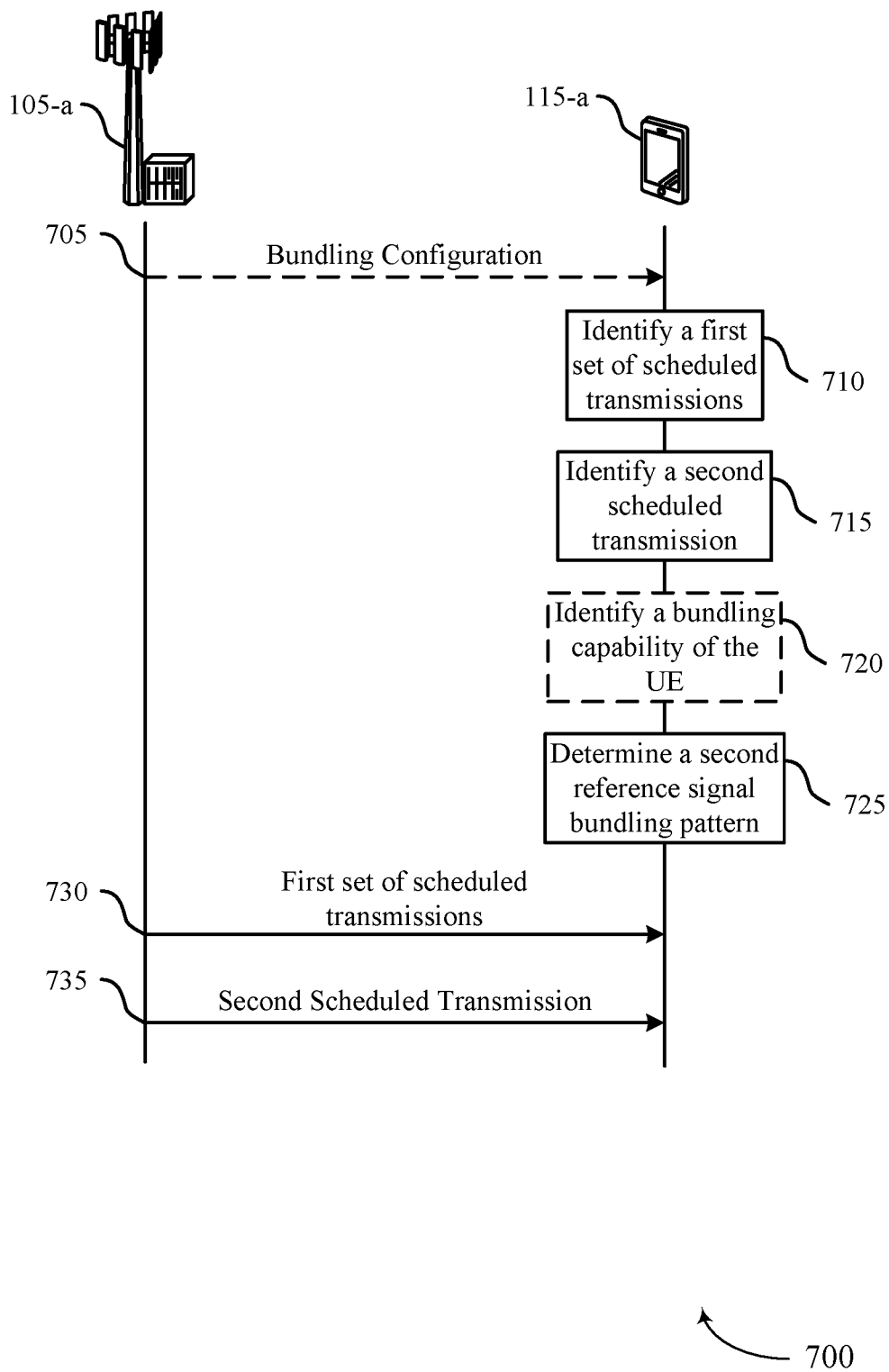
FIG. 7 illustrates an example of a process flow that supports shared channel reference signal bundling and multiple concurrent shared channel transmissions in accordance with aspects of the present disclosure.

FIG. 7 illustrates an example of a process flow 700 that supports shared channel reference signal bundling and multiple concurrent shared channel transmissions in accordance with aspects of the present disclosure. In some examples, the process flow 700 may be implemented by aspects of the wireless communications system 100, as described with reference to FIG. 1. The process flow 700 may include a base station 105-*a* and a UE 115-*a*, which may be examples of the corresponding devices described with reference to FIGS. 1 through 6A-D. Alternative examples of the following may be implemented, where some steps are performed in a different order than described or are not performed at all. In some cases, steps may include additional features not mentioned below, or further steps may be added.

At 705, the base station 105-*a* may transmit to the UE 115-*a*, and the UE 115-*a* may receive from the base station 105-*a*, a bundling configuration. In some cases, the base station 105-*a* may transmit in control signaling, for example, a DCI message. In some cases, the base station 105-*a* may signal the bundling configuration in or with a scheduling message (e.g., scheduling a first set of scheduled transmissions and/or a second scheduled transmission).

At 710, the UE 115-*a* may identify the first set of scheduled transmissions (e.g., to be communicated via a shared channel), where the first set of scheduled transmissions may be associated with a first reference signal bundling pattern. In some cases, the UE 115-*a* may identify the first set of scheduled transmissions according to a scheduling message and/or control signaling, for example, as may have been received with the bundling configuration at 705.

At 715, the UE 115-*a* may identify a second scheduled transmission (e.g., to be communicated via a shared channel, where the second scheduled transmission may at least partially overlap in time and/or frequency with at least one transmission of the first set of scheduled transmissions. In some cases, the UE 115-*a* may identify the second scheduled transmission according to a scheduling message and/or control signaling, for example, as may have been received with the bundling configuration at 705.

At 720, the UE 115-*a* may identify a bundling capability of the UE 115-*a*. For example, the UE 115-*a* may be configured with a capability to receive bundled transmissions (or a capability to receive transmissions that are not bundled) that overlap in time with colliding transmissions and/or a capability to receive bundled transmissions that overlap in time and frequency with the colliding transmissions.

At 725, the UE 115-*a* may determine a second reference signal bundling pattern for the first set of scheduled transmissions based at least in part on identifying the second scheduled transmission.

In some cases, at 725, the UE 115-*a* may determine to process the reference signals of each of the first set of scheduled transmissions individually. In some cases, the UE 115-*a* may determine that the second scheduled transmission overlaps in time with a reference signal of the at least one transmission of the first set of scheduled transmissions. For example, the UE 115-*a* may determine to process the reference signals of each of the first set of scheduled transmissions individually based on a capability (or lack of such a capability) of the UE 115-*a* to receive and/or process overlapping transmissions (e.g., according to the capability of the UE 115-*a* that the UE 115-*a* may have identified at 720).

In some cases, at 725, the UE 115-*a* may determine to bundle reference signals across a subset of the first set of scheduled transmissions. In some cases, the reference signals may include reference signal of a scheduled transmission of the at least one transmission of the first set of scheduled transmissions, (e.g., as the UE 115-*a* may have received from the base station 105-*a* at 730), where the scheduled transmission may at least partially overlap with the second scheduled transmission. In some cases, the reference signals may exclude reference signals of scheduled transmissions that at least partially overlap with the second scheduled transmission. Additionally or alternatively, the reference signals of the subset of the first set of scheduled transmissions may be scheduled prior to the second scheduled transmission. Additionally or alternatively, the reference signals of the subset of the first set of scheduled transmissions may be scheduled after the second scheduled transmission.

In some cases, at 725, the UE 115-*a* may modify the first reference signal bundling pattern based on determining that at least a portion of frequency resources associated with the second scheduled transmission do not overlap with frequency resources associated with the at least one transmission of the first set of scheduled transmissions (e.g., dropping or unbundling overlapping transmissions). In some cases, at 725, the UE 115-*a* may determine the second reference signal bundling pattern to be the same as the first reference signal bundling pattern based on determining that frequency resources associated with the at least one transmission of the first set of scheduled transmissions fully overlap with frequency resources associated with the second scheduled transmission (e.g., based on a capability of the UE 115-*a* to receive bundled transmissions that overlap in time and frequency with colliding transmissions).

In some cases, at 725, the UE 115-*a* may determine the second reference signal bundling pattern for the first set of scheduled transmissions based on the bundling capability of the UE 115-*a* (e.g., as the UE 115-*a* may have identified at 720). In some cases, at 725, the UE 115-*a* may determine the second reference signal bundling pattern for the first set of scheduled transmissions based on the bundling configuration, as the UE 115-*a* may have received from the base station 105-*a* at 705.

At 730, the base station 105-*a* may transmit to the UE 115-*a* the first set of scheduled transmissions (e.g., PDSCH transmissions). The UE 115-*a* may correspondingly receive from the base station 105-*a* at least a subset of the first set of scheduled transmissions (the subset including, e.g., the transmissions that are not overlapping with a colliding transmission) via the shared channel on the second reference signal bundling pattern.

At 735, the base station 105-*a* may transmit to the UE 115-*a*, and the UE 115-*a* may receive from the base station 105-*a*, the second scheduled transmission (e.g., a further PDSCH transmission) via the shared channel. In some cases, the first set of scheduled transmissions may be transmitted from a first transmitter and the second scheduled transmission may be transmitted from a second transmitter (e.g., at different antenna panels and/or different TRPs of the base station 105-*a*). Alternatively, the first set of scheduled transmissions may be transmitted from a transmitter at a first device and the second scheduled transmission may be transmitted from a transmitter at a second device, where, for example, one of the first or second device may be the base station 105-*a* and the other may be another wireless device (e.g., co-located with the base station 105-*a* or, alternatively, located at a different geographical location that the base station 105-*a*).

Figure 8:
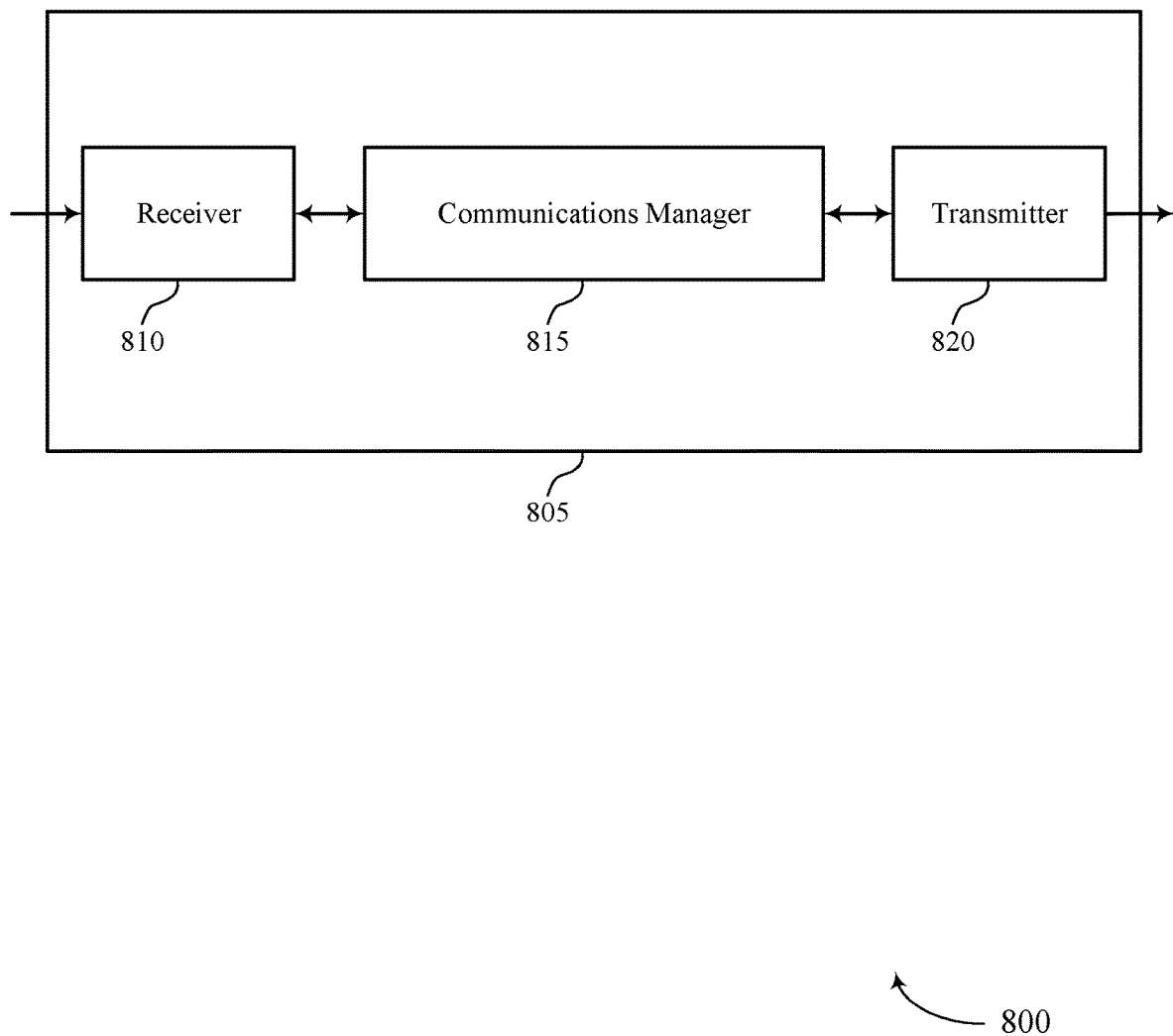
FIGS. 8 and 9 show block diagrams of devices that support shared channel reference signal bundling and multiple concurrent shared channel transmissions in accordance with aspects of the present disclosure.

FIG. 8 shows a block diagram 800 of a device 805 that supports shared channel reference signal bundling and multiple concurrent shared channel transmissions in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to shared channel reference signal bundling and multiple concurrent shared channel transmissions, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify a first set of scheduled transmissions for a shared channel, the first set of scheduled transmissions associated with a first reference signal bundling pattern, identify a second scheduled transmission for the shared channel that at least partially overlaps in time with at least one transmission of the first set of scheduled transmissions, determine a second reference signal bundling pattern for the first set of scheduled transmissions based on identifying the second scheduled transmission, receive at least a subset of the first set of scheduled transmissions via the shared channel based on the second reference signal bundling pattern, and receive the second scheduled transmission via the shared channel. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
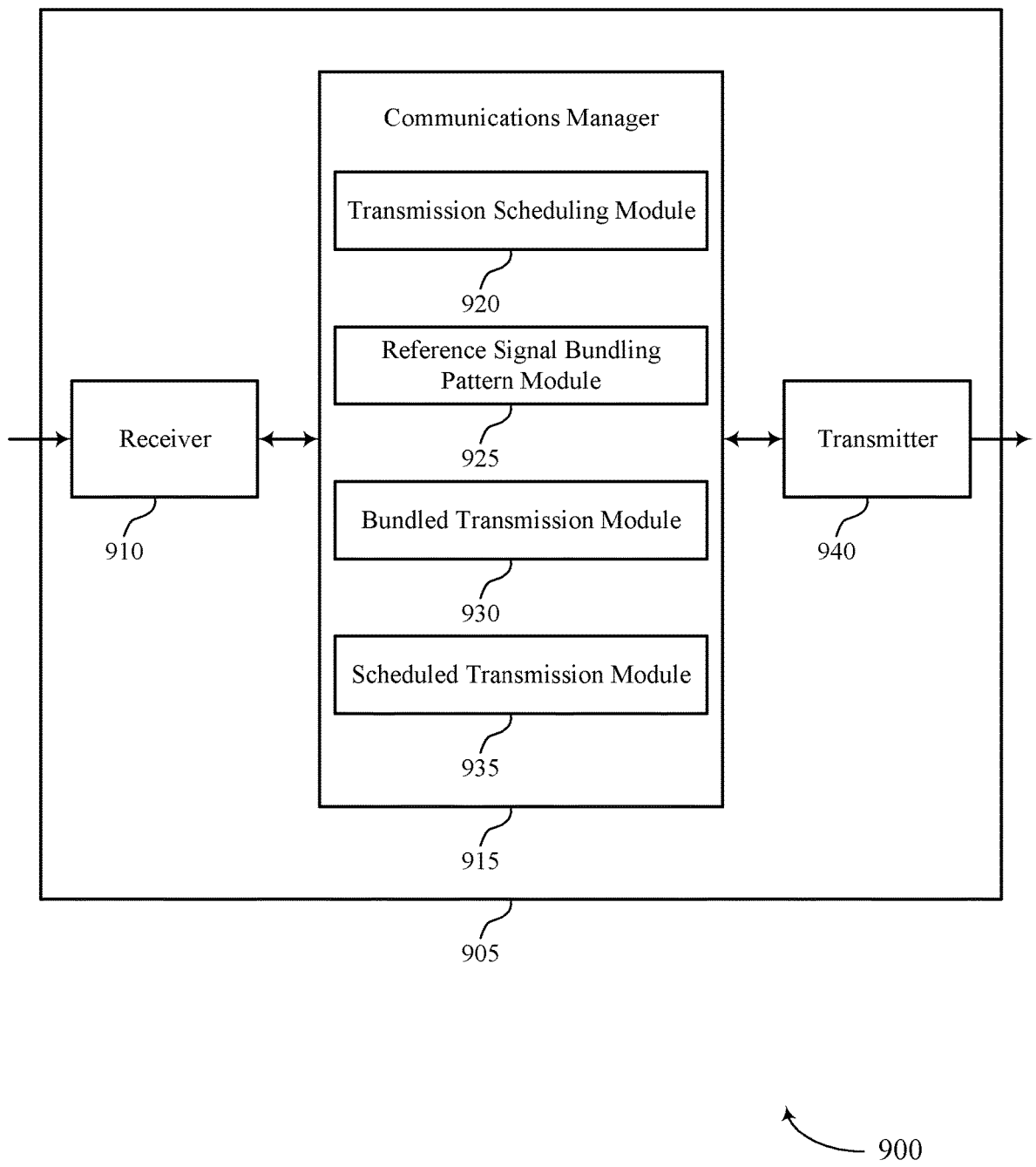

FIG. 9 shows a block diagram 900 of a device 905 that supports shared channel reference signal bundling and multiple concurrent shared channel transmissions in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to shared channel reference signal bundling and multiple concurrent shared channel transmissions, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a transmission scheduling module 920, a reference signal bundling pattern module 925, a bundled transmission module 930, and a scheduled transmission module 935. The communications manager 915 may be an example of aspects of the communications manager 1110 described herein.

The transmission scheduling module 920 may identify a first set of scheduled transmissions for a shared channel, the first set of scheduled transmissions associated with a first reference signal bundling pattern and identify a second scheduled transmission for the shared channel that at least partially overlaps in time with at least one transmission of the first set of scheduled transmissions.

The reference signal bundling pattern module 925 may determine a second reference signal bundling pattern for the first set of scheduled transmissions based on identifying the second scheduled transmission.

The bundled transmission module 930 may receive at least a subset of the first set of scheduled transmissions via the shared channel based on the second reference signal bundling pattern.

The scheduled transmission module 935 may receive the second scheduled transmission via the shared channel.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
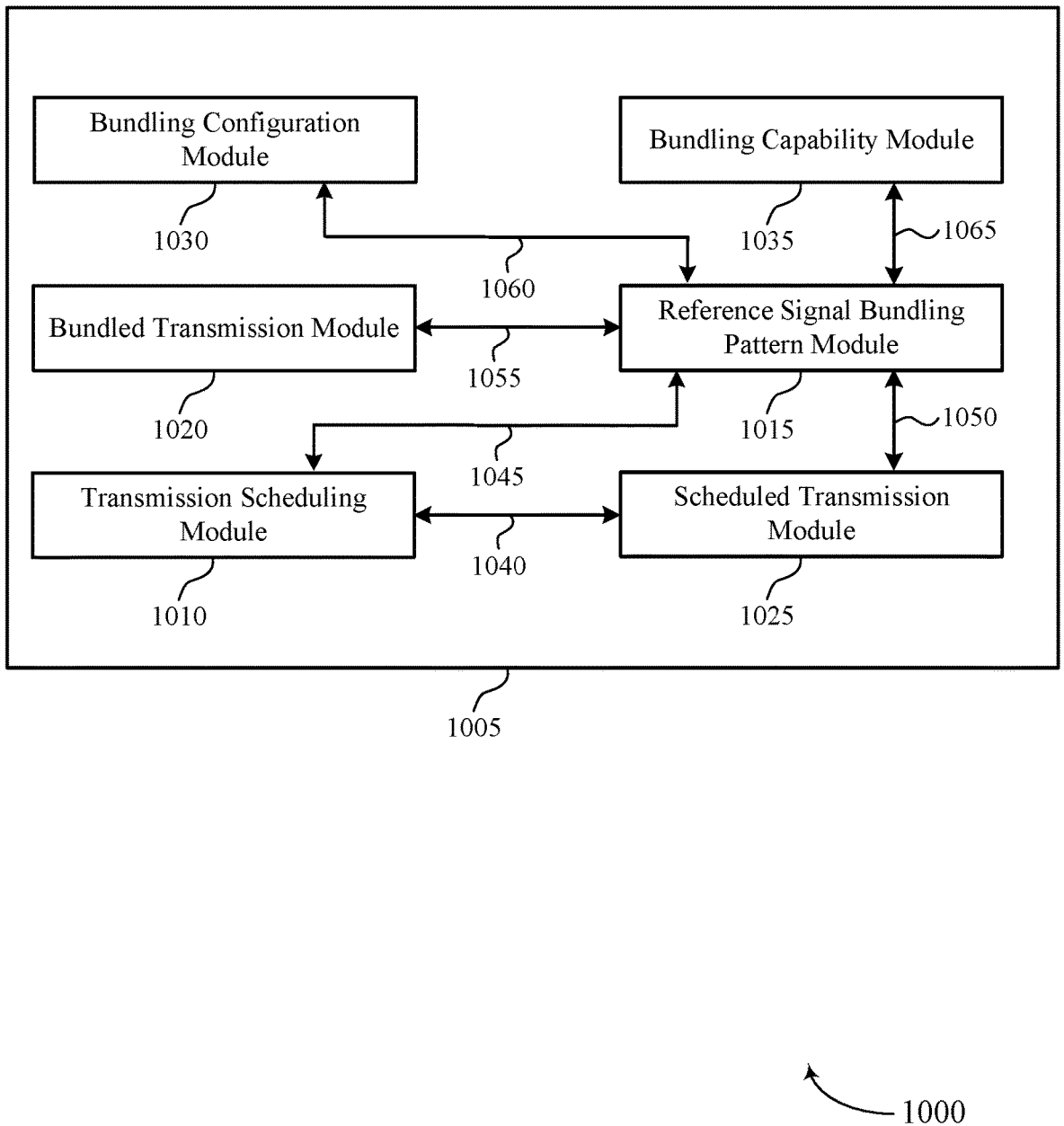
FIG. 10 shows a block diagram of a communications manager that supports shared channel reference signal bundling and multiple concurrent shared channel transmissions in accordance with aspects of the present disclosure.

FIG. 10 shows a block diagram 1000 of a communications manager 1005 that supports shared channel reference signal bundling and multiple concurrent shared channel transmissions in accordance with aspects of the present disclosure. The communications manager 1005 may be an example of aspects of a communications manager 815, a communications manager 915, or a communications manager 1110 described herein. The communications manager 1005 may include a transmission scheduling module 1010, a reference signal bundling pattern module 1015, a bundled transmission module 1020, a scheduled transmission module 1025, a bundling configuration module 1030, and a bundling capability module 1035. Each of these modules may communicate, directly or indirectly, with one another (e.g., via one or more buses).

The transmission scheduling module 1010 may communicate with the scheduled transmission module 1025 to obtain information 1040 to identify a first set of scheduled transmissions for a shared channel, the first set of scheduled transmissions associated with a first reference signal bundling pattern. In some examples, the transmission scheduling module 1010 also may identify a second scheduled transmission for the shared channel that at least partially overlaps in time with at least one transmission of the first set of scheduled transmissions.

The transmission scheduling module 1010 may communicate information 1045 related to the first set of scheduled transmissions and the second scheduled transmission to the reference signal bundling pattern module 1015, which may determine a second reference signal bundling pattern for the first set of scheduled transmissions based on identifying the second scheduled transmission by the transmission scheduling module 1010.

In some examples, the reference signal bundling pattern module 1015 may determine, via the information 1045 from the transmission scheduling module 1010 or information 1050 communicated from the scheduled transmission module 1025, that the second scheduled transmission overlaps in time with a reference signal of the at least one transmission of the first set of scheduled transmissions.

In some examples, the reference signal bundling pattern module 1015 may determine to bundle reference signals across a subset of the first set of scheduled transmissions.

In some examples, the reference signal bundling pattern module 1015 may modify the first reference signal bundling pattern to obtain the second reference signal bundling pattern based on a capability of the UE for receiving the second scheduled transmission and the at least one transmission of the first set of scheduled transmissions.

In some examples, the reference signal bundling pattern module 1015 may modify the first reference signal bundling pattern based on determining that at least a portion of frequency resources associated with the second scheduled transmission do not overlap with frequency resources associated with the at least one transmission of the first set of scheduled transmissions. Such determining may be performed by the transmission scheduling module 1010 using information 1040 from the scheduled transmission module 1025.

In some examples, the reference signal bundling pattern module 1015 may determine the second reference signal bundling pattern to be the same as the first reference signal bundling pattern based on determining that frequency resources associated with the at least one transmission of the first set of scheduled transmissions fully overlap with frequency resources associated with the second scheduled transmission. Such determining may be performed by the transmission scheduling module 1010 using information 1040 from the scheduled transmission module 1025.

In some cases, the bundled reference signals include at least one reference signal of a scheduled transmission of the at least one transmission of the first set of scheduled transmissions, the scheduled transmission at least partially overlapping with the second scheduled transmission.

In some cases, the bundled reference signals exclude reference signals of scheduled transmissions that at least partially overlap with the second scheduled transmission.

In some cases, the bundled reference signals of the subset of the first set of scheduled transmissions are scheduled prior to the second scheduled transmission.

In some cases, the bundled reference signals of the subset of the first set of scheduled transmissions are scheduled after the second scheduled transmission.

The bundled transmission module 1020 may receive at least a subset of the first set of scheduled transmissions via the shared channel based on the second reference signal bundling pattern, which may be communicated via bundling pattern information 1055 from the reference signal bundling pattern module 1015 to the bundled transmission module 1020.

In some examples, the bundled transmission module 1020 may determine to process reference signals of each of the first set of scheduled transmissions individually.

The scheduled transmission module 1025 may receive the second scheduled transmission via the shared channel.

In some cases, the first set of scheduled transmissions are transmitted from a first transmitter and the second scheduled transmission is transmitted from a second transmitter.

The bundling configuration module 1030 may receive a bundling configuration, where determining the second reference signal bundling pattern for the first set of scheduled transmissions is based on the bundling configuration. The bundling configuration may be received from the network (e.g., a base station) and communicated via information 1060 to the reference signal bundling pattern module 1015.

The bundling capability module 1035 may identify a bundling capability of the UE, where determining the second reference signal bundling pattern for the first set of scheduled transmissions is based on the bundling capability of the UE. For example, the bundling capability module may communicate information 1065 regarding the capability of the UE to the reference signal bundling pattern module 1015.

Figure 11:
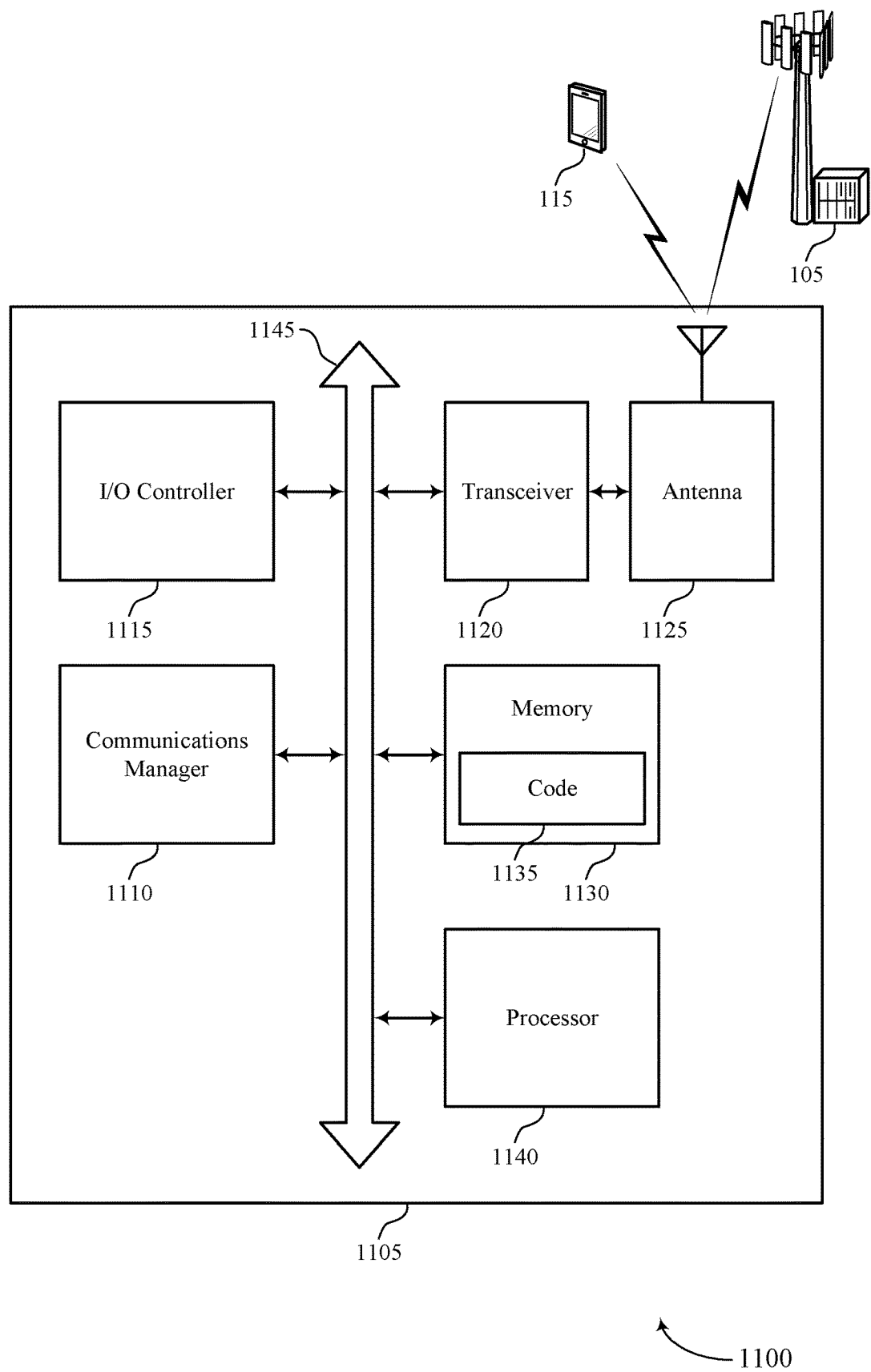
FIG. 11 shows a diagram of a system including a device that supports shared channel reference signal bundling and multiple concurrent shared channel transmissions in accordance with aspects of the present disclosure.

FIG. 11 shows a diagram of a system 1100 including a device 1105 that supports shared channel reference signal bundling and multiple concurrent shared channel transmissions in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify a first set of scheduled transmissions for a shared channel, the first set of scheduled transmissions associated with a first reference signal bundling pattern, identify a second scheduled transmission for the shared channel that at least partially overlaps in time with at least one transmission of the first set of scheduled transmissions, determine a second reference signal bundling pattern for the first set of scheduled transmissions based on identifying the second scheduled transmission, receive at least a subset of the first set of scheduled transmissions via the shared channel based on the second reference signal bundling pattern, and receive the second scheduled transmission via the shared channel.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting shared channel reference signal bundling and multiple concurrent shared channel transmissions).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
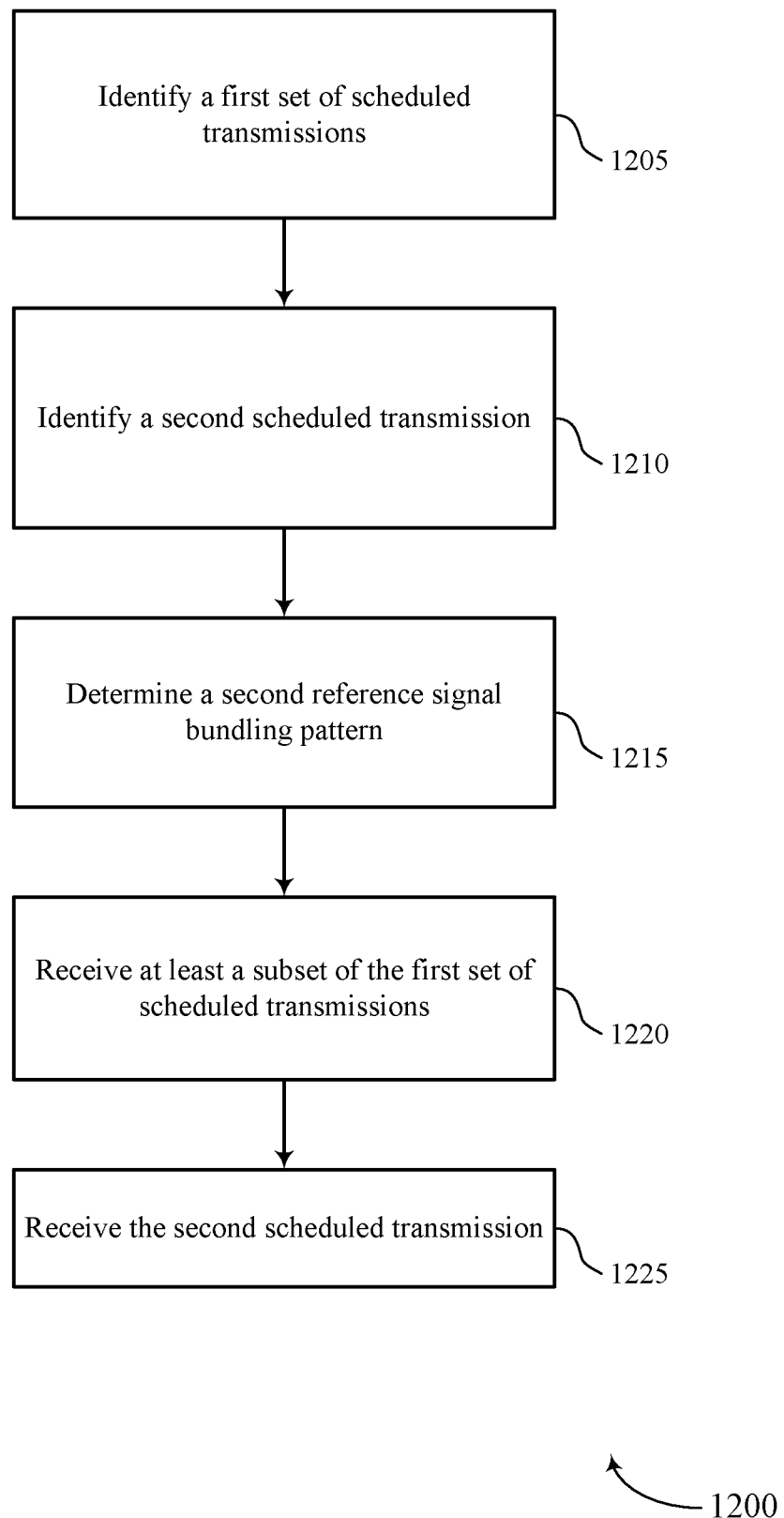
FIG. 12 shows a flowchart illustrating methods that support shared channel reference signal bundling and multiple concurrent shared channel transmissions in accordance with aspects of the present disclosure.

FIG. 12 shows a flowchart illustrating a method 1200 that supports shared channel reference signal bundling and multiple concurrent shared channel transmissions in accordance with aspects of the present disclosure. The operations of method 1200 may be implemented by a UE 115 or its components as described herein. For example, the operations of method 1200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1205, the UE may identify a first set of scheduled transmissions for a shared channel, the first set of scheduled transmissions associated with a first reference signal bundling pattern. The operations of 1205 may be performed according to the methods described herein. In some examples, aspects of the operations of 1205 may be performed by a transmission scheduling module as described with reference to FIGS. 8 through 11.

At 1210, the UE may identify a second scheduled transmission for the shared channel that at least partially overlaps in time with at least one transmission of the first set of scheduled transmissions. The operations of 1210 may be performed according to the methods described herein. In some examples, aspects of the operations of 1210 may be performed by a transmission scheduling module as described with reference to FIGS. 8 through 11.

At 1215, the UE may determine a second reference signal bundling pattern for the first set of scheduled transmissions based on identifying the second scheduled transmission. The operations of 1215 may be performed according to the methods described herein. In some examples, aspects of the operations of 1215 may be performed by a reference signal bundling pattern module as described with reference to FIGS. 8 through 11.

At 1220, the UE may receive at least a subset of the first set of scheduled transmissions via the shared channel based on the second reference signal bundling pattern. The operations of 1220 may be performed according to the methods described herein. In some examples, aspects of the operations of 1220 may be performed by a bundled transmission module as described with reference to FIGS. 8 through 11.

At 1225, the UE may receive the second scheduled transmission via the shared channel. The operations of 1225 may be performed according to the methods described herein. In some examples, aspects of the operations of 1225 may be performed by a scheduled transmission module as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving one or more control messages that schedule a first set of transmissions and a second transmission for a shared channel, wherein the first set of scheduled transmissions is associated with a first reference signal bundling pattern, and wherein the second scheduled transmission at least partially overlaps in time with at least one transmission of the first set of scheduled transmissions;
    receiving at least a subset of the first set of scheduled transmissions via the shared channel based at least in part on a second reference signal bundling pattern, wherein the second reference signal bundling pattern is based at least in part on the second scheduled transmission; and
    receiving the second scheduled transmission via the shared channel.

2. The method of claim 1, further comprising:
    processing reference signals of each of the first set of scheduled transmissions individually based at least in part on the second reference signal bundling pattern.

3. The method of claim 2, wherein determining the second reference signal bundling pattern comprises:
    determining that the second scheduled transmission overlaps in time with a reference signal of the at least one transmission of the first set of scheduled transmissions.

4. The method of claim 1, further comprising:
    bundling reference signals across a subset of the first set of scheduled transmissions based at least in part on the second reference signal bundling pattern.

5. The method of claim 4, wherein the bundled reference signals comprise at least one reference signal of a scheduled transmission of the at least one transmission of the first set of scheduled transmissions, the scheduled transmission at least partially overlapping with the second scheduled transmission.

6. The method of claim 4, wherein the bundled reference signals exclude reference signals of scheduled transmissions that at least partially overlap with the second scheduled transmission.

7. The method of claim 4, wherein the bundled reference signals of the subset of the first set of scheduled transmissions are scheduled prior to the second scheduled transmission.

8. The method of claim 4, wherein the bundled reference signals of the subset of the first set of scheduled transmissions are scheduled after the second scheduled transmission.

9. The method of claim 1, further comprising:
    modifying the first reference signal bundling pattern to obtain the second reference signal bundling pattern based at least in part on a capability of the UE for receiving the second scheduled transmission and the at least one transmission of the first set of scheduled transmissions.

10. The method of claim 1, further comprising:
    modifying the first reference signal bundling pattern to obtain the second reference signal bundling pattern when at least a portion of frequency resources associated with the second scheduled transmission do not overlap with frequency resources associated with the at least one transmission of the first set of scheduled transmissions.

11. The method of claim 1, wherein the second reference signal bundling pattern is the same as the first reference signal bundling pattern when frequency resources associated with the at least one transmission of the first set of scheduled transmissions fully overlap with frequency resources associated with the second scheduled transmission.

12. The method of claim 1, wherein the first set of scheduled transmissions are transmitted from a first transmitter and the second scheduled transmission is transmitted from a second transmitter.

13. The method of claim 1, further comprising:
    receiving a bundling configuration, wherein the second reference signal bundling pattern is based at least in part on the bundling configuration.

14. The method of claim 1, wherein the second reference signal bundling pattern is based at least in part on a bundling capability of the UE.

15. An apparatus for wireless communication at a user equipment (UE), comprising:
    a processor,
    memory coupled with the processor; and instructions stored in the memory and executable by the processor to cause the apparatus to:
receive one or more control messages that schedule a first set of transmissions and a second transmission for a shared channel, wherein the first set of scheduled transmissions is associated with a first reference signal bundling pattern, and wherein the second scheduled transmission at least partially overlaps in time with at least one transmission of the first set of scheduled transmissions;
receive at least a subset of the first set of scheduled transmissions via the shared channel based at least in part on a second reference signal bundling pattern, wherein the second reference signal bundling pattern is based at least in part on the second scheduled transmission; and
receive the second scheduled transmission via the shared channel.

16. The apparatus of claim 15, wherein the instructions are further executable by the processor to cause the apparatus to:
process reference signals of each of the first set of scheduled transmissions individually based at least in part on the second reference signal bundling pattern.

17. The apparatus of claim 16, wherein the second reference signal bundling pattern is based at least in part on the second scheduled transmission overlapping in time with a reference signal of the at least one transmission of the first set of scheduled transmissions.

18. The apparatus of claim 15, wherein the instructions are further executable by the processor to cause the apparatus to:
bundle reference signals across a subset of the first set of scheduled transmissions based at least in part on the second reference signal bundling pattern.

19. The apparatus of claim 18, wherein the bundled reference signals comprise at least one reference signal of a scheduled transmission of the at least one transmission of the first set of scheduled transmissions, the scheduled transmission at least partially overlapping with the second scheduled transmission.

20. The apparatus of claim 18, wherein the bundled reference signals exclude reference signals of scheduled transmissions that at least partially overlap with the second scheduled transmission.

21. The apparatus of claim 18, wherein the bundled reference signals of the subset of the first set of scheduled transmissions are scheduled prior to the second scheduled transmission.

22. The apparatus of claim 18, wherein the bundled reference signals of the subset of the first set of scheduled transmissions are scheduled after the second scheduled transmission.

23. The apparatus of claim 15, wherein the instructions are further executable by the processor to cause the apparatus to:
modify the first reference signal bundling pattern to obtain the second reference signal bundling pattern based at least in part on a capability of the UE for receiving the second scheduled transmission and the at least one transmission of the first set of scheduled transmissions.

24. The apparatus of claim 15, wherein the instructions are further executable by the processor to cause the apparatus to:
modify the first reference signal bundling pattern to obtain the second reference signal bundling pattern when at least a portion of frequency resources associated with the second scheduled transmission do not overlap with frequency resources associated with the at least one transmission of the first set of scheduled transmissions.

25. The apparatus of claim 15, wherein the second reference signal bundling pattern is the same as the first reference signal bundling pattern when frequency resources associated with the at least one transmission of the first set of scheduled transmissions fully overlap with frequency resources associated with the second scheduled transmission.

26. The apparatus of claim 15, wherein the first set of scheduled transmissions are transmitted from a first transmitter and the second scheduled transmission is transmitted from a second transmitter.

27. The apparatus of claim 15, wherein the instructions are further executable by the processor to cause the apparatus to:
receive a bundling configuration, wherein the second reference signal bundling pattern is based at least in part on the bundling configuration.

28. The apparatus of claim 15, wherein the second reference signal bundling pattern is based at least in part on a bundling capability of the UE.

29. An apparatus for wireless communication at a user equipment (UE), comprising:
means for receiving one or more control messages that schedule a first set of transmissions and a second transmission for a shared channel, wherein the first set of scheduled transmissions is associated with a first reference signal bundling pattern, and wherein the second transmission at least partially overlaps in time with at least one transmission of the first set of scheduled transmissions;
means for receiving at least a subset of the first set of scheduled transmissions via the shared channel based at least in part on a second reference signal bundling pattern, wherein the second reference signal bundling pattern is based at least in part on the second scheduled transmission; and
means for receiving the second scheduled transmission via the shared channel.

30. A non-transitory computer-readable medium storing code for wireless communication at a user equipment (UE), the code comprising instructions executable by a processor to:
receive one or more control messages that schedule a first set of transmissions and a second transmission for a shared channel, wherein the first set of scheduled transmissions is associated with a first reference signal bundling pattern, and wherein the second transmission at least partially overlaps in time with at least one transmission of the first set of scheduled transmissions;
receive at least a subset of the first set of scheduled transmissions via the shared channel based at least in part on a second reference signal bundling pattern, wherein the second reference signal bundling pattern is based at least in part on the second scheduled transmission; and
receive the second scheduled transmission via the shared channel.

* * * * *